(12) United States Patent
Marquette et al.

(10) Patent No.: US 7,185,094 B2
(45) Date of Patent: Feb. 27, 2007

(54) MEDIA SESSION FRAMEWORK USING A CONTROL MODULE TO DIRECT AND MANAGE APPLICATION AND SERVICE SERVERS

(75) Inventors: Brian Marquette, Longmont, CO (US); Robert Hernandez, Niwot, CO (US)

(73) Assignee: SandCherry, Inc., Boulder, CO (US)

( * ) Notice: Subject to any disclaimer, the term of this patent is extended or adjusted under 35 U.S.C. 154(b) by 745 days.

(21) Appl. No.: 09/965,057

(22) Filed: Sep. 26, 2001

(65) Prior Publication Data

US 2002/0143874 A1 Oct. 3, 2002

Related U.S. Application Data

(60) Provisional application No. 60/280,213, filed on Mar. 30, 2001.

(51) Int. Cl.
*G06F 13/00* (2006.01)
(52) U.S. Cl. ............ 709/225; 709/219; 709/226; 709/229
(58) Field of Classification Search ............... None
See application file for complete search history.

(56) References Cited

U.S. PATENT DOCUMENTS

| | | | |
|---|---|---|---|
| 5,574,784 A * | 11/1996 | LaPadula et al. | 379/265.02 |
| 5,717,745 A * | 2/1998 | Vijay et al. | 379/112.05 |
| 5,754,774 A | 5/1998 | Bittinger et al. | |
| 5,754,784 A | 5/1998 | Garland et al. | |
| 5,790,789 A | 8/1998 | Suarez | |
| 5,894,554 A | 4/1999 | Lowery et al. | |
| 5,903,877 A | 5/1999 | Berkowitz et al. | |
| 5,925,098 A * | 7/1999 | Freund et al. | 709/203 |
| 5,946,498 A | 8/1999 | Chiang et al. | |
| 5,956,509 A | 9/1999 | Kevner | |
| 6,049,820 A | 4/2000 | Murphy, Jr. et al. | |
| 6,088,728 A | 7/2000 | Bellemore et al. | |
| 6,477,561 B1 * | 11/2002 | Robsman | 718/105 |
| 6,763,520 B1 * | 7/2004 | Seeds | 718/101 |
| 6,816,907 B1 * | 11/2004 | Mei et al. | 709/229 |
| 2001/0030970 A1 * | 10/2001 | Wiryaman et al. | 370/401 |
| 2002/0059170 A1 * | 5/2002 | Vange | 707/1 |
| 2004/0073670 A1 * | 4/2004 | Chack | 709/225 |
| 2006/0056298 A1 * | 3/2006 | Nag et al. | 370/230 |

FOREIGN PATENT DOCUMENTS

EP 0 978 976 A2 2/2000

\* cited by examiner

*Primary Examiner*—Viet D. Vu
(74) *Attorney, Agent, or Firm*—Holland & Hart

(57) ABSTRACT

The present invention provides for multiplexing applications. In particular, an access receives a request from a user to access an application. Based on the received request, the access server establishes a communication link between the access server and the user. The access request is stored in an input request queue when an available communication path to the requested application is available. The communication path between the input request queue and the application is established, the stored request is removed and sent to the application.

16 Claims, 19 Drawing Sheets

MEDIA SESSION FRAMEWORK USING A CONTROL MODULE TO DIRECT AND MANAGE APPLICATION AND SERVICE SERVERS

This application claims the benefit of U.S. Provisional Patent Application Ser. No. 60/280,213 filed Mar. 30, 2001, entitled METHODS AND APPARATUES USING A CONTROL MODULE TO DIRECT AND MANAGE APPLICATIONS AND SERVICE SERVERS.

FIELD OF THE INVENTION

The present invention relates to using a control module to direct, manage and access application and service servers and to provide management, dynamic resource allocation and load balancing and, more particularly, the present invention relates to using the Session Initiation Protocol (SIP) as part of a media session framework to dynamically access and utilize applications and call services residing on one or more processing units or servers and maintaining satisfactory load balancing between the processing units or servers.

BACKGROUND OF THE INVENTION

Conventional software packages often require access to memory, databases, or other applications to perform their designed function. For example, a user may access a software package that may require a particular type of data conversion. One way to enable the software package to perform the conversion is to program the conversion directly into the software package. Recently, however, there has been a trend where the user accesses the software package (referred to as an application) and the software package, in turn, accesses another software package (referred to as a service program) when the application requires a complex functionality. Instead of programming the application to perform the complex functionality itself, the application is programmed to access other service programs designed specifically to perform the requested functionality.

FIGS. 1 and 2 show conventional systems for assigning applications that require voice recognition services to voice recognition servers that can handle those requests. One of skill in the art would recognize that the prior art systems in FIGS. 1 and 2 have broad application for accessing other complex functionalities beyond simply voice recognition services. Voice recognition services, however, are a common application. Moreover, the prior art system in FIG. 2 is specialized for voice recognition applications constituting one common type of application that requires multiplexing service programs Taken in more detail, FIG. 1 shows a conventional system 100. Conventional system 100 includes a plurality of voice-processing modules 102 and a plurality of telephone lines 104 assigned to each voice-processing module 102. Voice-processing modules 102 further include a plurality of clients 106 and a voice-processing server 108. System 100 uses a "round robin" strategy for assigning voice recognition requests to voice recognition servers. In this architecture, one of the clients 106 in voice-processing module 102 receives speech utterances via one of the incoming telephone lines 104. The client 106 that receives the speech utterance is pre-assigned to a voice-processing server 108.

System 100 implements a "round robin" strategy because system 100 assigns calls as the calls arrive to the next voice-processing module 102 in line regardless of the load currently on that voice-processing module. This prior art system 100 does not account for any variance in use dependent upon system loading, or message type. Such a system can result in a loss of efficiency owing to ineffective workflow assignment. This prior art system also does not account for the differing capabilities of particular servers.

Recognizing the deficiency in the simple round-robin system described in FIG. 1, FIG. 2 shows another existing approach to multiplexing service programs in voice recognition applications that attempts to cure this defect. In this architecture 200, at least one application 210 requires a service from one of the plurality of speech recognition servers 218 (i.e., service programs). In order to obtain access to the one of the servers 218, the application 210 requiring the server 218 interacts with a mediator 206 over bus 240. The mediator 206 controls various standard telephony aspects of the application such as detecting calls and identifying break points in speech ("end-pointing"). The mediator 206 also interacts with a resource manager 214 over bus 242. The primary task of the resource manager 214 is to identify an appropriate instance of a speech recognition server 218 for a given application request. In other words, mediator 206 receives a request from application 210 requesting access to one of the servers 218. Mediator 206 communicates this request to the resource manager 214, which provides access to one of the servers 218.

Based on the type of message and specifically the resources that will be required to fulfill that request, along with the then current loading of the servers 218 in architecture 200, the resource manager 214 determines which instance of speech recognition server 218 is most appropriate. When examining the type of message, the resource manager 214 may evaluate the grammar needed to process the utterance, the processing capabilities of each speech recognition server 218 for the grammar in question and the amount of free processing capacity of each speech recognition server 218. Once a speech recognition server 218 is assigned for a given call, the resource manager 214 communicates with the speech recognition server 218 via a bus 246 and the application 210 requiring server 218 communicates with server 218 by using bus 240 to communicate with the mediator 206 which in turn uses bus 244 to communicate with the server 218.

This prior art architecture does not account for multiple services other than multiple services of the same type, i.e., speech recognition servers 218. Speech recognition servers 218 are the only resource that is multiplexed. In other words, this prior art system does not attempt to multiplex a plurality of different services for a single application. In this example, the prior art system multiplexes a number of speech recognition servers 218, but does not attempt to multiplex a number of speech recognition servers 218 with, for example, a number of imaging servers, other speech application related servers, or other non-speech application servers.

In addition, the connections between system sub-components are fixed. These connections include bus 240 between applications 210 and mediators 206, bus 242 between mediators 206 and resource managers 214, bus 244 between mediators 206 and speech recognition servers 218, and bus 246 between resource managers 214 and speech recognition servers 218. These connections are not scalable to large application spaces and will not be practical over distributed, non-local networks.

Moreover, the resources to be allocated are not dynamic—a fixed set of resources is defined in the initial configuration. The fixed connections require either a low system throughput or a high bandwidth. Furthermore, the prior art systems, and in particular speech recognition systems, do not account for load balancing or dynamically allocating applications 210.

This prior art system also does not account for types of resources other than grammar type, speech recognition server capabilities with a specific grammar and then current processing capacities. There are a wide variety of other resources that may be important for load balancing and dynamic system configuration, depending on the application and the environment in which it operates.

Conventional telephony is switching from a circuit-switched based network to a packet-based network. Open System Interconnection ("OSI") is one particularly useful digital data communication protocol that supports "host to host" data transfers between co-operating applications on the differing hosts. (Note that while the protocol is defined between separate hosts, the co-operating applications can reside on the same host). Conventionally, however, the packet-based networks for Voice over Internet Protocol (VoIP) are designed to function using traditional Transmission Control Protocol/Internet Protocol ("TCP/IP"). The TCP/IP does not map to an OSI system. In particular, the packet-based, conventional TCP/IP does not adequately define sessions (call control) or presentation of the real-time transport for the multiple medias that need to be transmitted.

Therefore, it would be desirable to develop an architecture that is capable of multiplexing multiple servers and addresses these and other problems identified in the prior art.

SUMMARY OF THE INVENTION

The foregoing and other features, utilities and advantages of the invention will be apparent from the following more particular description of a preferred embodiment of the invention as illustrated in the accompanying drawings.

To attain the advantages of and in accordance with the purpose of the present invention methods for multiplexing applications are provided. In particular, at least one access server is provided that has access to at least one application. A request from at least one user is received at the access server to access the at least one application. Based on the received request, a communication link is established between the at least one access server and the at least one user, where the received request is stored in an input request queue. A check is made for an available communication path to the requested application and, when an available communication path is available, the communication path between the input request queue and the at least one application is established and the stored request is removed and sent to the requested application.

The present invention further provides an apparatus for service multiplexing. The apparatus comprises at least one access server capable of providing access to at least one application. The at least one access server comprising at least one agent and at least one service concentrator. The service concentrator comprising at least one application handler, at least one input service queue, and at least one request handler. The at least one access server is adapted to receive multiple requests to access the at least one application and the at least one service concentrator is adapted to multiplex multiple requests to access the at least one application.

The present invention still further provided a computer program product having a computer usable medium including computer readable code embodied therein for processing data to control at least one requests for access to at least one application. The computer usable medium comprising a request receiving module configured to receive at least one request for access to the at least one application. The request is received at a communication establishing module configured to establish a communication link with at least one client requesting access to the at least one application. A storing module configured to store the at least one received request and a checking module configured to check whether a communication path that is capable of allowing access to the at least one application. The communication establishing module further configured to establish a communication link with the at least one application.

BRIEF DESCRIPTION OF THE DRAWING

The accompanying drawings, which are incorporated in and constitute a part of this specification, illustrate some preferred embodiments of the invention and, together with the description, explain the goals, advantages and principles of the invention. In the drawings.

DETAILED DESCRIPTION

Reference will now be made in detail to presently preferred embodiments of the invention, examples of which are illustrated in the accompanying drawings. It is intended that all matter contained in the description below or shown in the accompanying drawings shall be interpreted as illustrative and not in a limiting sense.

Figure 3:
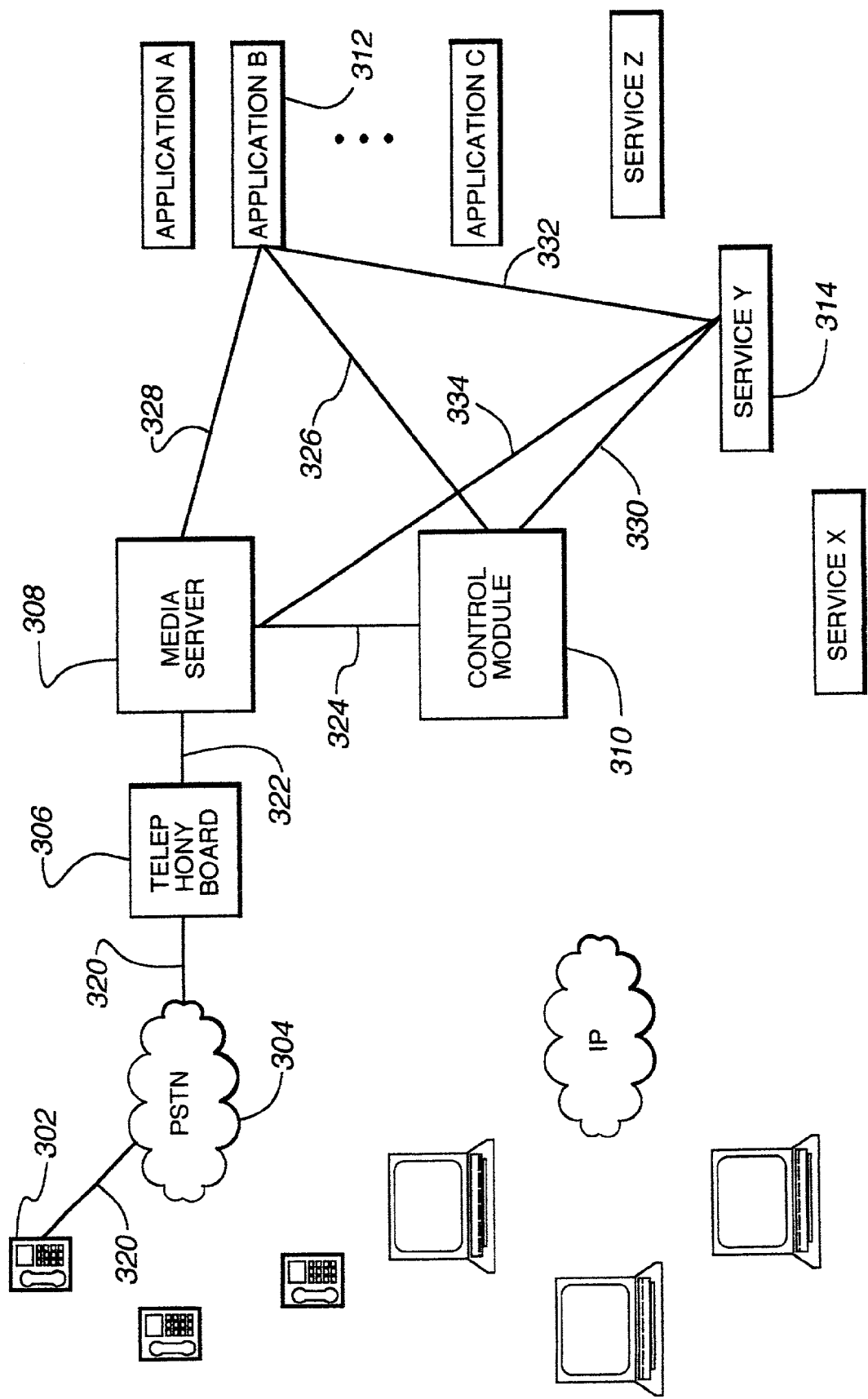
FIG. 3 is a diagrammatic representation of a network architecture consistent with the present invention.

FIG. 3 shows an embodiment of the present invention. In particular, FIG. 3 shows a network architecture 300 in accordance with one embodiment of the present invention. Architecture 300 includes a telephony board 306 that provides an interface between a public switched telephone network (PSTN) 304 and a media server 308. In other words, FIG. 3 illustrates the placing of a call over the standard public switched telephone network (the PSTN 304) to an application residing within a server in accordance with the present invention. Architecture 300 includes, in addition to the telephony board 306 and media server 308, a control module 310, at least one application program 312, and at least one service program 314. While each piece of architecture 300 is shown as being separate and distinct, the individual pieces could be contained in one processing unit, such as a single server, or many as a matter of design choice. Additionally, the pieces could be located in one central location or spread over a multitude of remote locations. Note also that the figure and subsequent discussions depict a media server which could be replaced by a softswitch. A softswitch is a software program that performs essentially the same functions as a traditional hardware telecom switch. A softswitch would also perform the functions as the media server 308 but a softswitch is typically constructed for and priced for large scale, high volume carrier grade environments. Media servers or media gateways are typically more appropriate for smaller scale, lower volume, lower cost environments.

In operation, a user makes a call from a standard telephone 302 to a standard telephone number, which is assigned to register at telephony board 306. PTSN 304 routes the call in a conventional manner from telephone 302 to the telephony board 306 (which is configured to receive that phone number), typically as a part of a T-1, DS3 or similar trunk line that multiplexes numerous phone lines for transport purposes. Preferably, the telephony board 306 handles standard call management (such as detecting and terminating calls) at the hardware level in a conventional manner, although telephony board 306 could use software or some combination of software and hardware. In operation, when the telephony board 306 receives a call, it notifies the media server 308. Media server 308 receives the notification and provides the telephony board 306 with the address of an available port (not specifically shown in FIG. 3) for reception of the call. Telephony board 306 then passes the connected call to the available port of media server 308.

Media server 308 receives the call from telephony board 306, which may have performed some processing on the call data, and, preferably, the media server performs some processing on the call data. First the call signaling is established and then the media connections.

First, telephony board 306 routes the call data over communication channel 322 to the input port of media server 308 using a standard PSTN signaling protocols, such as a PRI-ISDN signaling protocols, or using a version of those signaling protocols as manipulated by the telephony board 306 in conventional ways. The input port of media server 308 (not shown) is formatted to receive the standard PSTN signal protocol, as processed, if appropriate, by the telephony board 306. Preferably, media server 308 converts the PRI-ISDN signaling data to a standard Internet protocol, preferably a Session Initiation Protocol (SIP) protocol. The conversion from the standard PSTN signal protocol to the SIP protocol is explained in more detail in FIGS. 5–9.

Second, as part of this protocol conversion, the media server 308 generates and sends a SIP application INVITE to a control module 310 over communication channel 324. Preferably, the SIP application INVITE generated by the media server 308 corresponds to the called telephone number and can be mapped to one of the application programs 312. Furthermore, the SIP application INVITE would contain the port address information of the media server 308 to which the application 312 will eventually connect.

The control module 310 examines the SIP application INVITE received over communication channel 324 and determines which of the applications 312 corresponds to the called telephone number, for example, in this case the call is intended for application 312 type B. Because of the unique set-up of architecture 300, several applications 312 type B may be accessible. Also, the applications 312 type B could be available on several different processing units, which could be in several different local or remote locations. Therefore, control module 310 follows conventional IP protocols to locate an appropriate instance of application 312 type B running on a hardware platform capable of running application 312 type B and accessible over architecture 300. Once control module 310 identifies an address or location of an available application 312 type B on the IP network, control module 310 forwards the SIP application INVITE over communication channel 326 to that instance of application 312 type B.

Using information in the SIP application INVITE, such as the address of the port on media server 308 associated with the call that is requesting application 312 type B, application 312 type B accepts the SIP application INVITE sent over communication channel 326 and sets up a media connection over communication channel 328 back to the proper port on media server 308. The application 312 type B can now send and receive data to and from the caller 302 over communication channel 328 through media server 308 (with the media server 308 performing the necessary protocol conversions) and then over communication channel 322 to the telephony board 306 and finally over communication channel 320 to the caller 302. Communication channel 324 from the media server 308 to control module 310 and communication channel 326 from control module 310 to application 312 type B remain active to provide control functions as will be explained in more detail below.

As will be explained in more detail below, the control module 310 selects a particular instance of application 312 type B using the best information it has at that moment. By the time that application 312 type B actually receives the SIP application INVITE, its situation may have changed so that it is no longer available. In this case, application 312 type B refuses the SIP application INVITE. If the first identified application 312 type B denied or refused the SIP application INVITE, control module 310 would continue to search for available resources by sending the SIP application INVITE to the next best available application 312 type B. If control module 310 cannot identify an available instance of application 312 type B, control module 310 could cause the generation of a standard response informing the user to call later or hold.

At some point during the interaction with the caller, the application 312 type B may determine that it needs one of the available adjunct service programs 314, such as service program X, Y, and Z, which also may be located in the same processing unit as application 312 type B or in a separate processing unit, whether in a local or remote location. In order to obtain access to the requested service program 314, application 312 type B sends a SIP service INVITE to control module 310 over communication channel 326 for access to one of the available service programs 314, such as a service program 314 type Y. As with the SIP application INVITE, the control module 310 receives the SIP service INVITE and locates an appropriate instance of service 314 type Y running on a hardware platform capable of running service program 314 type Y that is accessible over architecture 300, which follows conventional IP protocols. Once control module 310 identifies an address or location of an available service program 314 type Y on the IP network, it forwards the SIP service INVITE to that instance of service program 314 type Y over communication channel 330. Service program 314 type Y could be at either a local or a remote location.

Using information in the SIP service INVITE, such as the address of the application 312 type B that is calling for service program 314 type Y and the port address of the media server 308 accessing application 312 type B, service program 314 type Y accepts the SIP service INVITE sent over communication channel 330 and sets up media connections over communication channel 332, which is back to application 312 type B, and communication channel 334, which is back to the appropriate port on the media server 308. The application 312 type B can now communicate with the service program 314 type Y and service program 314 type Y can communicate with the caller 302. For example, service program 314 type Y might be a text to speech service and application 312 type B might be a voice application. In this example, application 312 type B might send text over communication channel 332 to service program 314 type Y to convert text to speech. The service program 314 type Y can process the request and send the speech or audio result of that conversion to the caller 302 routing through the media server 308 over communication channel 334.

Figure 11:
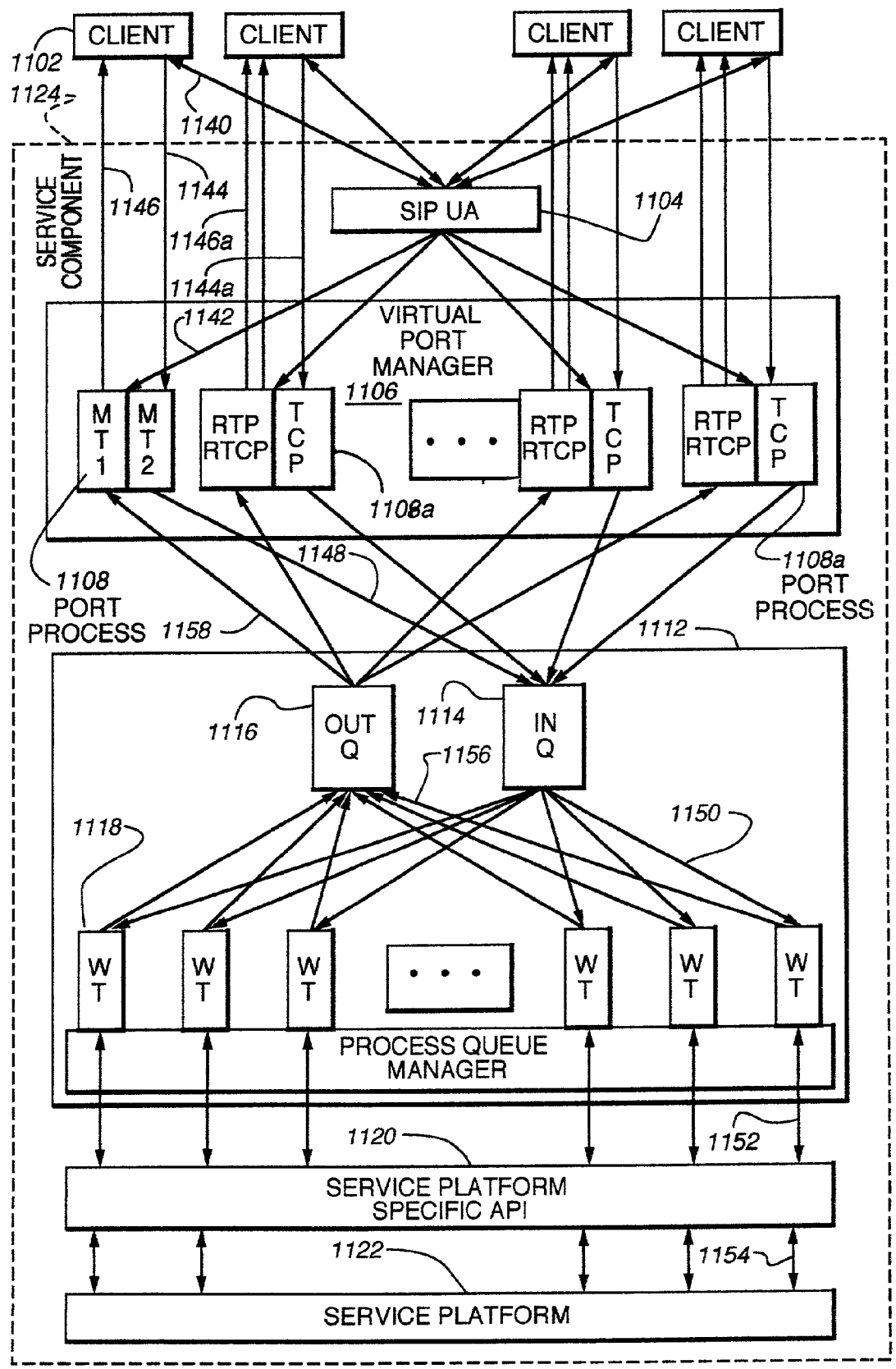
FIG. 11 is a work flow diagram illustrating dynamically assigning service programs to applications consistent with the present invention.

Establishing the session between the service program 314 type Y and application 312 type B is explained below (FIG. 11). Notice, the interconnection between service program and application is exemplary and the session format of the present invention is applicable to any combination of establishing interconnection between any of the media server 308, the control module 310, the applications 312, and the service programs 314.

Figure 4:
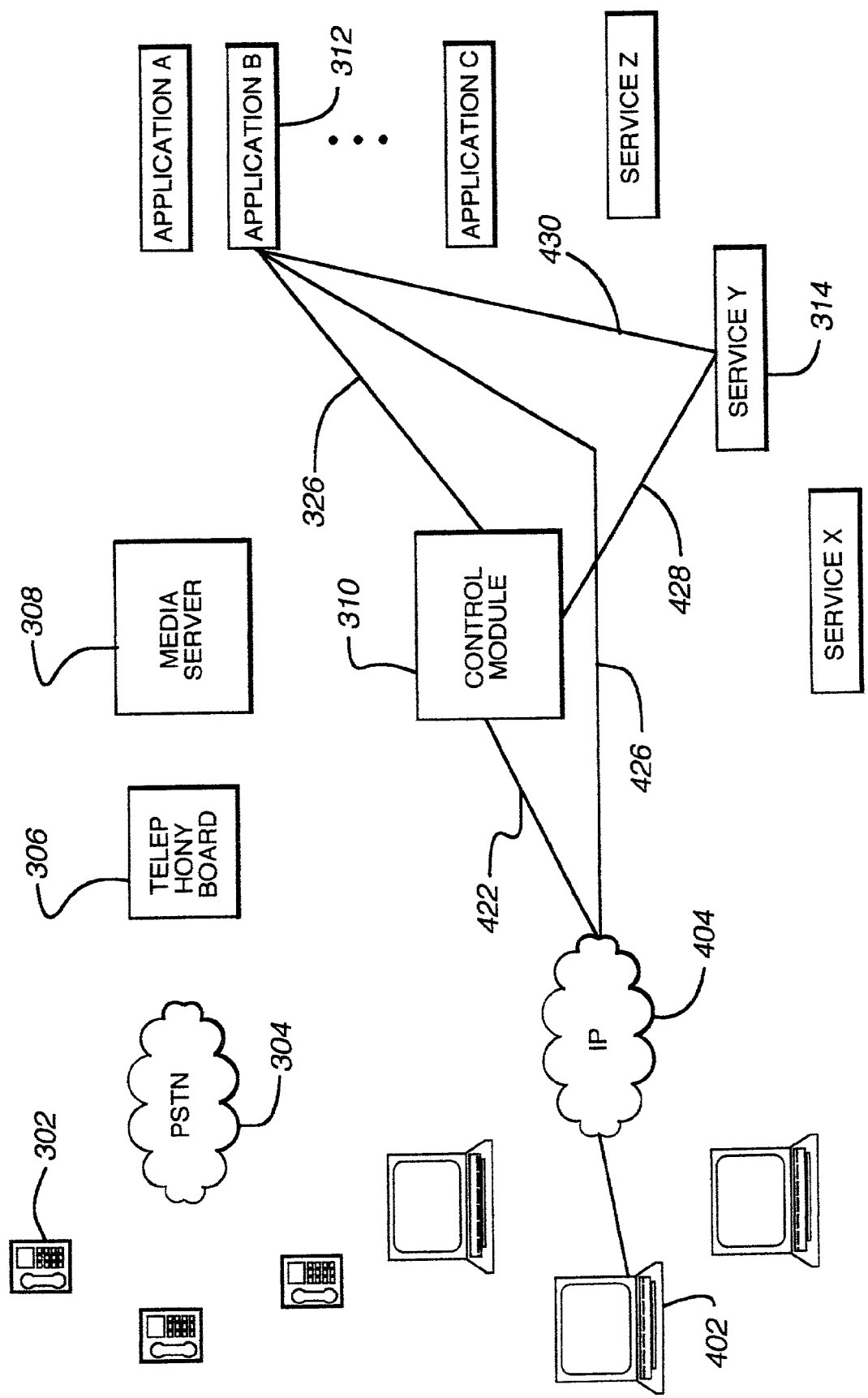
FIG. 4 is a diagrammatic representation of a network architecture consistent with the present invention.

FIG. 4 shows a network architecture 400 in accordance with one embodiment of the present invention. FIG. 4 illustrates the placing of a call over a standard Internet Protocol (IP) network 404 to an application residing within a server in accordance with the present invention. In FIG. 3, a call is placed over the conventional PSTN using standard PSTN signaling protocol (PRI-ISDN) and transport protocol (which is pulse code modulation—PCM) that must be translated to SIP and realtime transport protocol (RTP), respectively. The media server 308 performs both of these conversions and stands as an intermediary or interface between the caller placing a call at the phone 302 and the control module 310, applications 312 and service programs 314, all of which communicate using the SIP signaling and RPT transport protocols. In FIG. 4, however, a caller uses a SIP enabled computing device 402 to place a call (or request) over IP network 404. This computing device 402 could be a computer, a SIP enabled telephone or other SIP enabled computing device. Thus, device 402 already uses SIP for signaling and RTP for media transport so the call does not need to route through the media server or other interface to perform signaling conversions. In other respects, the operation of the call is the same in FIG. 4 as in FIG. 3. Notice, if device 402 was IP telephony enabled but not configured for SIP, a media server could be used to convert the IP telephony enabled device to a SIP signal.

For clarity, the operation of architecture 400 will be explained in full, however. Architecture 400 includes the control module 310, at least one application program 312, and at least one service program 314. In operation, a user makes a call from a calling device 402, which could be a computer-based phone or a telephone or other computing device that uses the standard SIP signaling protocols. Because device 402 produces a SIP format signal and the media transport is already RTP, there is no need for the call to route through the media server 308 for protocol and transport translation. Therefore, the calling device 402 sends a SIP application INVITE to a well-known SIP address, which is associated with a particular type of application. The call routes over the IP network 404, which includes communication channel 422 connecting calling device 402 to the control module 310. Of course, communication channel 422 is shown for convenience and ease of reference because, as one of skill in the art would recognize on reading this disclosure, standard Internet Protocols use packet transmission and the data from calling device 402 arrives at the IP connection of control module 310 over several routes or channels. The control module 310 routes the call as in FIG. 3: the control module 310 examines the SIP application INVITE received over communication channel 422 and determines which of the applications 312 corresponds to the SIP address in the SIP application INVITE, for example, in this case the call is intended for application 312 type B.

Control module 310 locates an appropriate instance of application 312 type B running on a hardware platform capable of running application 312 type B accessible over architecture 400, which follows conventional IP protocols. Once control module 310 identifies an address or location, whether local or remote, of an available application 312 type B on the IP network, control module 310 forwards the SIP application INVITE over communication channel 326 to that instance of application 312 type B.

Using information in the SIP application INVITE, such as the URL address of the calling device 402 that is calling for use of application 312 type B, application 312 type B accepts the SIP application INVITE sent over communication channel 326 and sets up a media connection over communication channel 426 back to the calling device 402 (again communication between IP enabled devices typically uses packet transmission which could route over several different paths). The application 312 type B can now send and receive data to and from the caller 402 over communication channel 426. Communication channel 422 from calling device 402 to control module 310 and communication channel 326 from control module 310 to Application 312 type B remain active to provide control functions as will be explained in more detail below.

As in FIG. 3, the control module 310 selects a particular instance of application 312 type B using the best information it has at that moment. (This selection is described in detail below in conjunction with FIGS. 10, 12, and 13.) By the time that application 312 type B receives the SIP application INVITE, its situation may have changed so that it is no longer available. In this case, it refuses the SIP application INVITE. If the first identified application 312 type B denied or refused the SIP application INVITE, control module 310 would continue to search for available resources by sending the SIP application INVITE to the next best available application 312 type B. If no applications 312 type B are available, a standard response could be generated informing the user to call later or hold.

At some point during the interaction with the caller 402, the application 312 type B may determine that it needs one of the available adjunct service programs 314, such as service program X, Y, and Z. Application 312 type B would access an adjunct services program as described above in conjunction with FIG. 3; however, when a service program 314 accepts the SIP service INVITE, service program 314 would use the URL address of the calling device 402 to connect directly to the calling device 402 using communication path 432 instead of routing through an intermediary, such as media server 308. Thus, the application 312 type B could communicate with the service program 314 type Y and service program 314 type Y can communicate with the calling device 402. For example, service program 314 type Y might be a text to speech service and application 312 type B might be a voice application. In this example, application 312 type B might send text over communication channel 430 to service program 314 type Y to convert text to speech. The service program 314 type Y can send the speech or audio result of that conversion to the caller 402 over communication channel 432.

Figure 5:
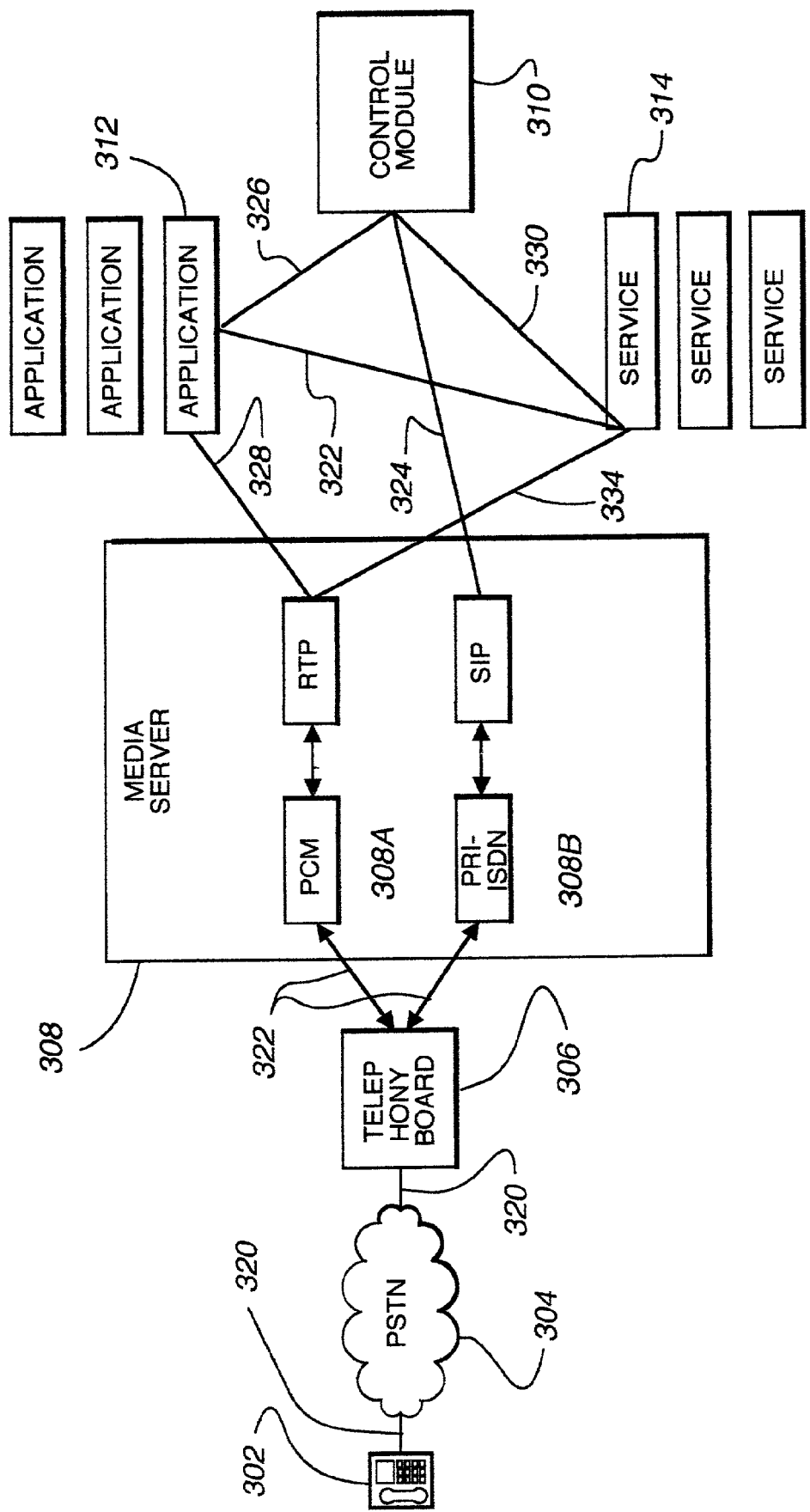
FIG. 5 is a diagrammatic representation of the media server 308 shown in FIG. 3.
Figure 6:
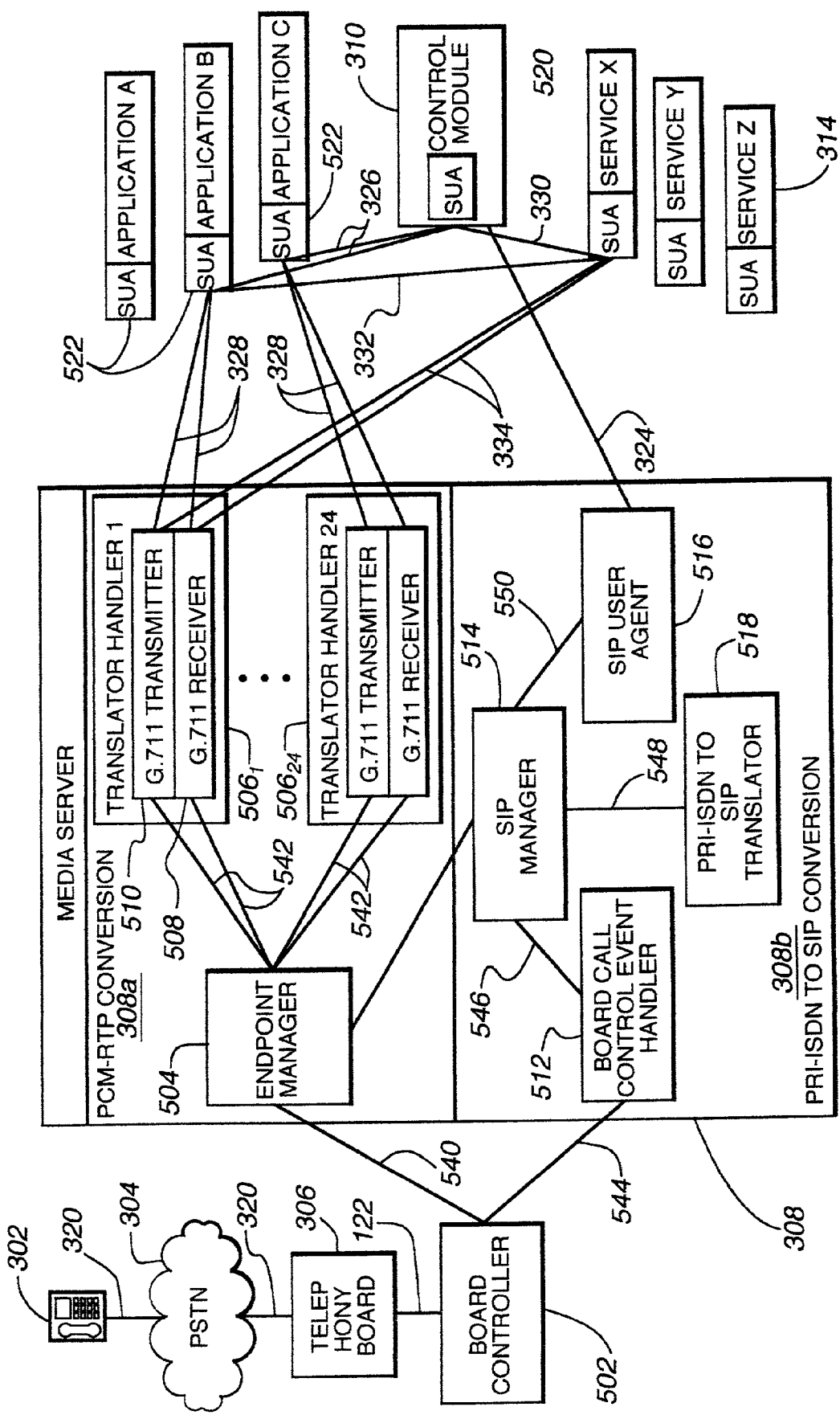
FIG. 6 is another diagrammatic representation of the media server 308 shown in FIG. 3.

FIGS. 5 and 6 show an internal architecture 500 for the media server 308 in accordance with one embodiment of the present invention. As mentioned above, one of the functions of media server 308 is to perform protocol conversion. Media server 308, therefore, has a pulse code modulation (PCM) to realtime transport protocol (RTP) conversion section 308A and a PRI-ISDN to SIP conversion section 308B. With reference to FIG. 6, these conversions will be explained in further detail.

As best shown in FIG. 6, the PCM to RTP conversion section 308A includes an endpoint manager 504 and at least one translator handler 506, but as shown in FIG. 6 one translator handler in media server 308 preferably exists for each port on the telephony board 306, where each port on the telephony board 306 corresponds to a phone line. Therefore, a media server 308 supporting a 24-port telephony board 306 would have translator handlers $506_1$ to $506_{24}$. Each translator handler 506 further includes a G.711 transmitter 510 and a G.711 receiver 508. The use of the G.711 standard is exemplary, and other standards could similarly be used. Media server 308 also includes a board controller 502. Board controller 502 is represented as a separate entity from the media server 308; however, it could be internal to media server 308 as a matter of design choice. Notice that while the translation handlers 506 are represented as components, it is preferable to use software to develop the handlers as required.

As best shown in FIG. 6, the PRI-ISDN to SIP conversion section 308B includes a board call control event handler 512, a SIP Manager 514, a SIP User Agent 516 and a PRI-ISDN to SIP translator 518.

Figure 7:
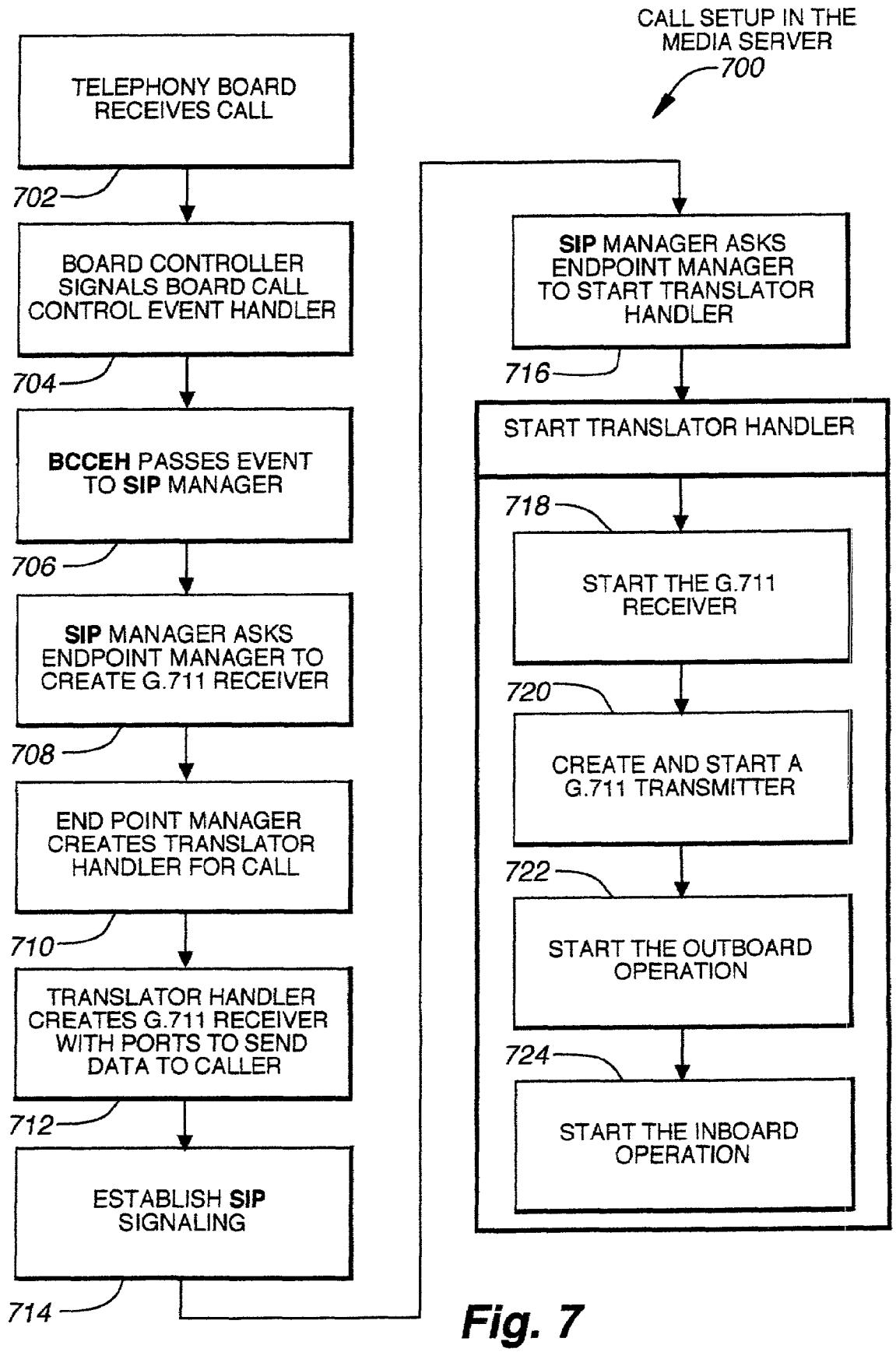
FIG. 7 is a flow chart illustrating call setup procedures consistent with the present invention.

FIG. 7 illustrates a flow chart 700 representing the call set up procedure, "Call Set Up in the Media Server." When the telephony board 306 receives a call it forwards the call signal to the board controller (step 702). As one of ordinary skill in the art will recognize on reading this disclosure, the nature of the board controller 502 will vary depending on the hardware of the telephony board 306. In many cases for current boards, it will be a C dynamic link library but this is just one example.

The board controller 502 receives the call and sends an event to the board call control event handler 512 (step 704) indicating that there is a call, for example, on phone line 1. The board call control event handler 512 signals the SIP manager 514 (step 706) which is responsible for coordinating call setup, call tear down and other aspects of call control. The SIP manager 514 asks the endpoint manager 504 to create a G.711 receiver 508 (step 708).

On receiving this request from the SIP manager 514, the endpoint manager 504 creates the translator handler $506_1$ (step 710) that in turn creates a G.711 receiver 508, which is internal to the translator handler $506_1$ (step 712). The translator handler $506_1$ creates the G.711 receiver 508 (step 712), but the translator handler $506_1$ does not start the G.711 receiver 508 until the SIP signaling is properly established and the translator handler $506_1$ itself is started. The endpoint manager 504 creates the translator handler $506_1$ (step 710) and the translator handler 506 creates the G.711 receiver 508 (step 712) using conventional methods. The G.711 receiver 508 'receives' data from the application 312 and sends it to the caller 302—this is referred to as the outbound operation. Similarly, the G.711 transmitter 510, which has not been created at this point (see further below), will receive data from the caller 302 and 'transmit' it to the application 312—this is referred to as the inbound operation.

As a part of the creation of the G.711 receiver 508, but prior to its starting, the G.711 receiver 508 opens ports for RTP and RTCP in the media server 308. These are ports that the application 312 will use when establishing its connections for the outbound operation, i.e., for sending data to the caller. The ports are dynamically allocated for each call. When any platform is establishing or allocating ports, preferably those ports are drawn from a pool of available ports, but they could be created anew as a design decision.

Figure 8:
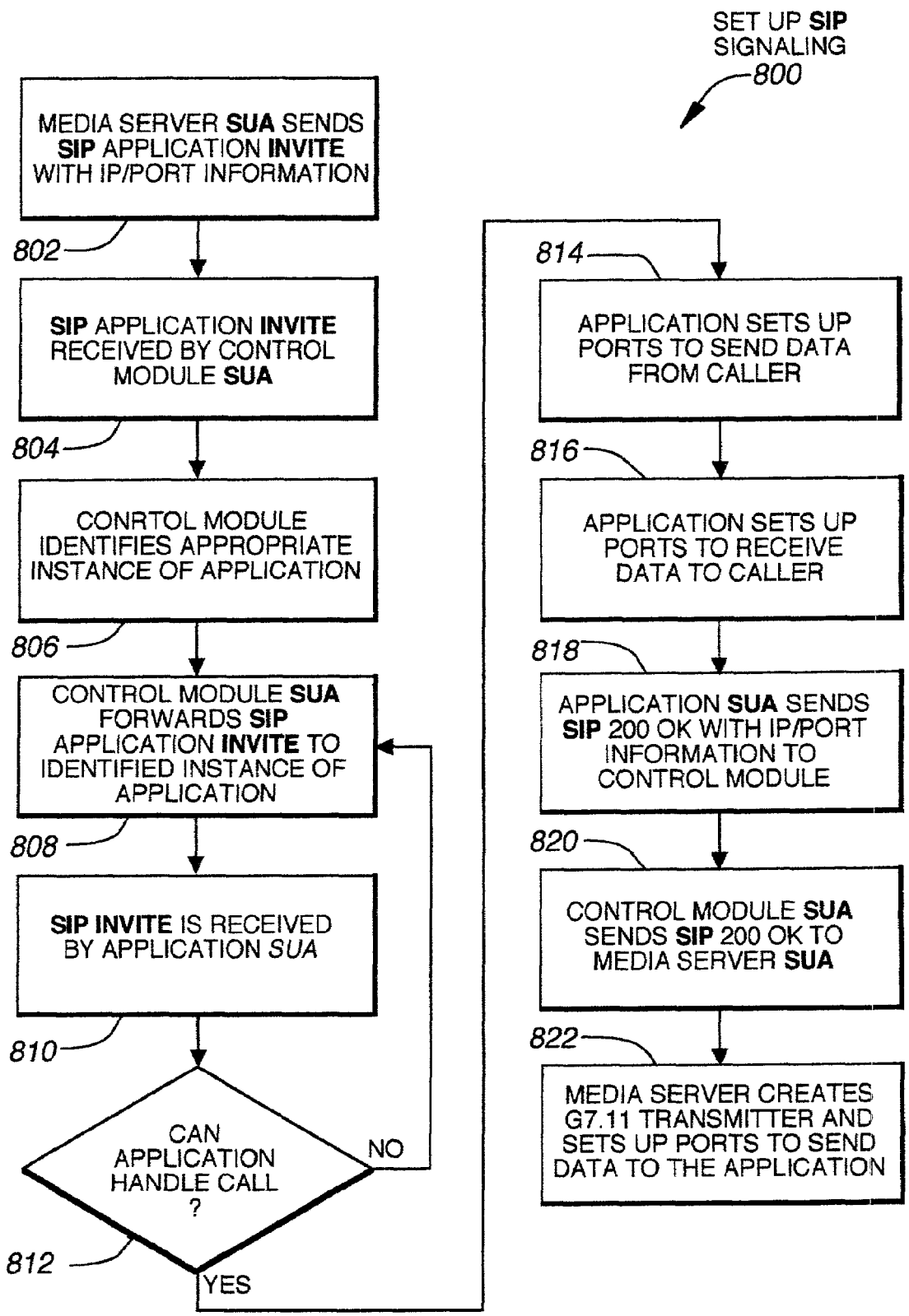
FIG. 8 is a flow chart illustrating establishment of SIP signaling consistent with the present invention.

After the G.711 receiver 508 is created, the SIP signaling is established (step 716) as will be shown in detail with reference to flow chart 800, FIG. 8.

After the SIP signaling is established as described in flow chart 800, FIG. 8, below, the SIP manager 514 asks the endpoint manager 504 to start the translator handler $506_1$ (step 716). The translator handler $506_1$ first starts the G.711 receiver 508 (step 718) whose ports are now connected to the application 312. The G.711 receiver 508 begins listening to the RTP port for data packets heading to the calling device 302 from the application 312.

Then the translator handler $506_1$ creates the G.711 transmitter 510 (step 720). The G.711 transmitter 510 will be sending data from the caller 302 to the application 312. In the final SIP message to establish the SIP signaling (as explained below in FIG. 8), the application 312 indicated the ports on which it will be receiving data from the caller. The G.711 transmitter 510 establishes its ports to transmit data to the ports that the application 312 has established to receive data from the caller 302 (step 712), as the application 312 indicated in its SIP message.

The translator handler $506_1$ then starts the G.711 transmitter 510 (also step 720) that waits for data that needs to be sent from the caller 302 to the application 312. After starting the G.711 received 508 and the G.711 transmitter 510, the translator handler 506 starts the outbound operation (step 722) and the inbound operation (step 724), as shown in Flow Charts 900A and 900B.

Flow chart 800, FIG. 8, depicts establishing the SIP signaling for a call. This follows the standard procedure for establishing SIP signaling. As one of the first steps, the media server 308 uses its SIP user agent 516 to send to the SIP user agent 520 of the control module 310 the SIP application INVITE for the application 312 that the calling device 302 is calling (step 802). The media server 308 includes in this SIP application INVITE the IP address and port number of the RTP/RTCP ports opened by the G.711 receiver 508 for sending data received from the application 312 to the caller 302 (step 802). This will enable the application 312 to establish the connections by which it will send media data to the caller 302.

The SIP user agent 520 of the control module 310 receives the SIP application INVITE (step 804) and the control module 310 identifies an appropriate instance of the application 312 (step 806) that the calling device 302 is calling, such as application 312 type B as shown in FIGS. 3 and 4. The control module 310 uses its SIP user agent 520 to forward the SIP application INVITE to the identified instance of the desired application 312 (step 808). The SIP user agent 522 of the hardware box hosting the instance of application 112 type B receives the SIP application INVITE (step 810) and determines whether it can accept the call (step 812). (Note that in FIG. 6, application 312 type A, application 312 type B and application 312 type C are depicted as if they all ran on separate hardware boxes with each box having its own SIP User Agent 522 (SUA). In practice, any applications 312 hosted on the same hardware box would utilize the same SIP User Agent 522.) To determine whether it can accept the SIP application INVITE, the SIP user agent 522 of the hardware box hosting the application 312 verifies that there is an available instance of the desired application 312 and that there is an appropriate set of available ports to communicate with the media server 308.

If the call cannot be accepted, the SIP user agent 522 of the hardware box refuses the SIP application INVITE ('no' branch of step 812) and the SIP user agent 520 of the control module 310 again attempts to identify the next best instance of the application 312 that the calling device 302 is calling (looping back to step 806). If the call can be accepted ('yes' branch of step 812), the SIP user agent 522 of the hardware box negotiates with appropriate internal modules (not shown) to establish ports for the application 312 to send data to the caller 302 (Step 814). The ports for sending data to the caller are established by setting up those ports to connect specifically to the ports sent as a part of the SIP application INVITE (step 802), that is, to the ports that the G.711 receiver 508 created to receive data from the application 312 and send on to the calling device 302 (step 712).

The SIP user agent 522 of the hardware box also negotiates with appropriate internal modules (not shown) to establish ports for the application 312 to receive data from the caller 302 (step 816).

Once the application 312 has done all of its necessary set up, the SIP user agent 522 of the hardware box associated with the selected application 312 sends a 200 OK message to the SIP user agent 520 on the control module 310 (step 818) that forwards the acceptance to the SIP user agent 516 on media server 308 (step 820). (The SIP 200 OK message is a conventional acknowledgement signal associated with the SIP standard, but one of skill in the art would recognize the applicability of other protocols and their negotiation and handshaking strategies.) The 200 OK message from the application 312 includes the IP/port information for media ports that the application 312 has established to receive data from the calling device 302 (step 816). This tells the translator handler $506_1$ on the media server 308 what ports associated with the application 312 will be receiving data from the calling device 302. The translator handler $506_1$ creates the G.711 transmitter 510 which will use this port information: the G.711 transmitter 510 establishes its ports to connect to the ports that the application 312 has established to receive data from the calling device 302 (Step 822 and step 720).

Outbound operations send data from the application 312 to the calling device 302 over the RTP connection through the G.711 receiver 508 as discussed above. The nature of the outbound operation will vary depending on the hardware installed in telephony board 306 and board controller 502, but in essence involves reading data from the RTP port of the G.711 receiver 508 on the media server 308 and writing it to the telephony board 306.

Typically and preferably, the translator handler 506 makes a call to the board controller 502 to start an outbound operation. For some current boards, one step in this process will be buffering the data between the G.711 receiver 508 and the telephony board 306. While this varies depending on the hardware board, one way this is done is by having the telephony board 306 read buffers of data and send the buffers of read data out to the calling device 302.

Figure 9A:
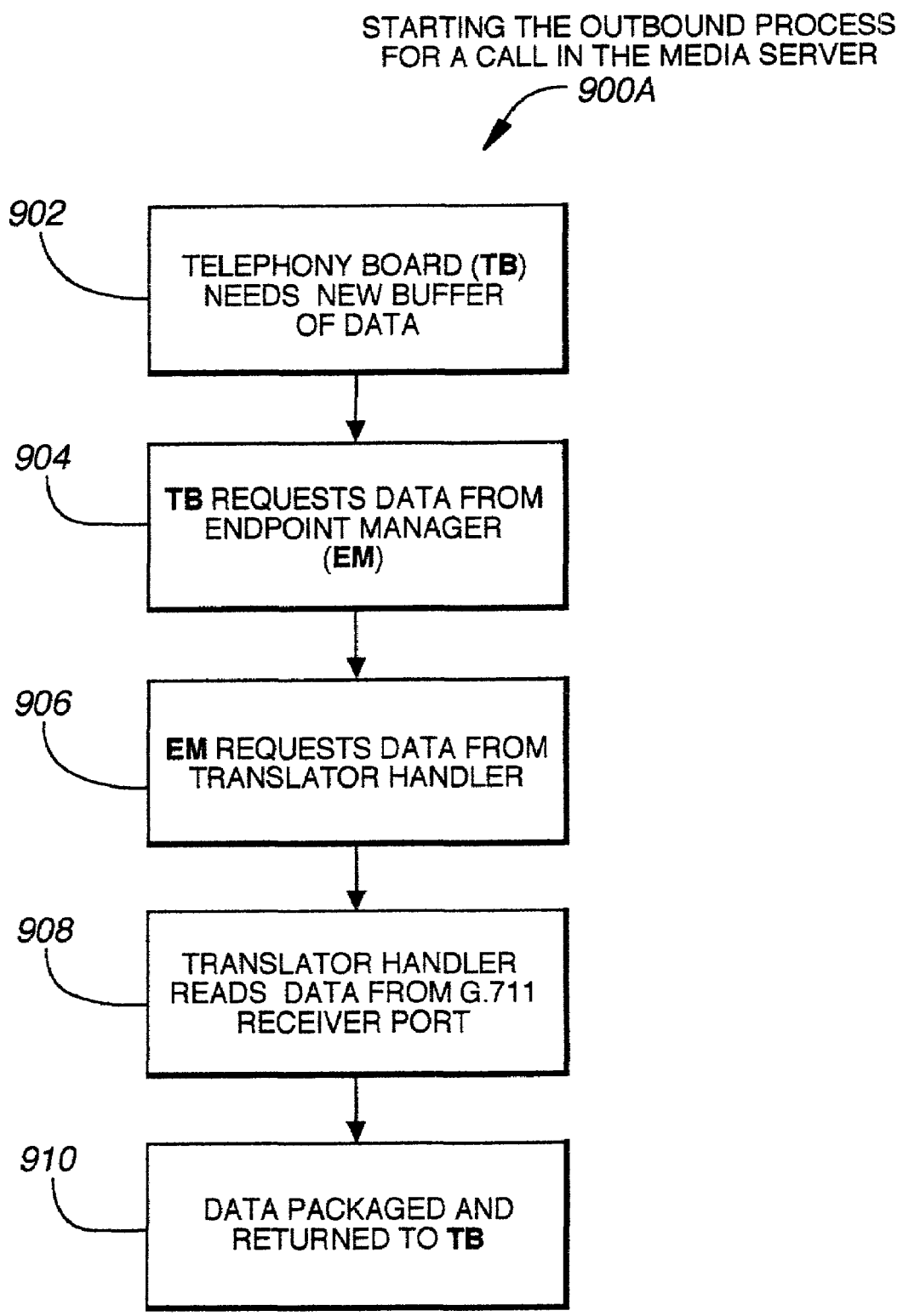
FIG. 9, is a flow chart illustrating starting an outbound process and an inbound process through the media server 308 consistent with the present invention.
Figure 9B:
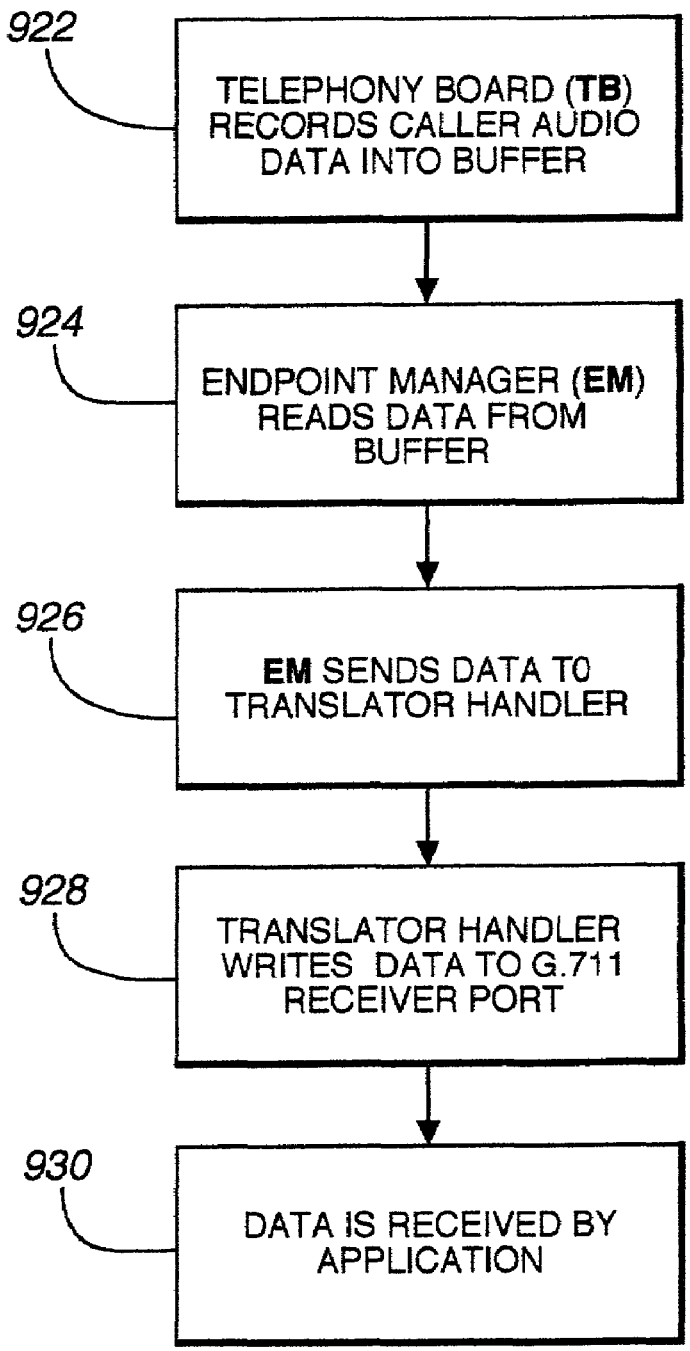

One exemplary method for this buffering for the outbound process for some current boards is shown by flow chart 900A in FIG. 9A. When the telephony board 306 needs a new buffer (step 902), it makes a request of the endpoint manager 504 (step 904), which in turn requests the next segment of data from the translator handler $506_1$ (step 906). The translator handler $506_1$ obtains the data by reading from the RTP port of the G.711 receiver 508 that is connected to the application 312 (step 908). This data is appropriately packaged and passed on to the telephony board 306 (step 910).

The translator handler $506_1$ also starts the inbound operation (step 718 of flow chart 700). Inbound operations send data from the calling device 302 to the application 312 over the RTP connection discussed above for the G.711 transmitter 510. The process is reciprocal to the outbound operation process and is described by flow chart 900B, FIG. 9B, but will not otherwise be explained.

Two protocol translations are required for a server (created in accordance with one embodiment of the present invention) to inter-operate with the Public Switched Telephone Network (PSTN) 304: PRI-ISDN to SIP and PCM to RTP.

Referring back to FIG. 6, the conversion from PRI-ISDN to SIP preferably begins with the telephony board 306 parsing the ISDN data and sending pieces of the header information to the SIP manager 514. These data include such things as the caller's telephone number, the telephone number being called, the number of the actual phone line (for example, number 6 out of the 24 lines in a T-1), and the event. Events include such things as 'new call', 'user hung up call' and other events that indicate a change of call state.

The SIP manager 514 uses this information for various purposes. For example, for a new call, it asks the endpoint manager 504 to create a G.711 receiver 508, telling the endpoint manager 504 what phone line (for example, in the T-1 trunk) the call is on. The SIP manager 514 also uses this information when sending a SIP message. Depending on the event, the SIP manager 504 asks the PRI-ISDN to SIP translator 518 to create a SIP message that is appropriate for that event. A 'new call' event, for example, would result in a SIP INVITE message while a 'user hung up call' event would result in a SIP BYE message.

A typical SIP message has a variety of fields as are described in the standards document RFC 2543 which is administered by the Internet Engineering Steering Group within the Internet Engineering Task Force, which reference is incorporated herein by reference. When the PRI-ISDN to SIP translator 518 creates a new message, it typically includes fields to identify (1) the SIP address of the intended recipient, (2) the type of media that will be transmitted, (3) the ports the sender will receive that media type on, and (4) the call id.

The translation from a standard PSTN telephone number to a SIP address is generally straightforward: "sip:" is pre-pended to the phone number. As a fictitious example, the phone number 202-555-4567 at the Acme company would be translated into sip:2025554567@acme.com. The type of media that will be transmitted is typically known and supplied by the sender. An example of the ports the data will be received on is given above: the G.711 receiver allocates those ports. Finally, the call id is an internal construct used to identify each call uniquely. For a call that comes in over the PSTN, the call id maps directly to a telephone line managed by the telephony board.

The translation from SIP back to ISDN is reciprocal. The SIP manager 514 converts the SIP addresses of the sender and receiver back into standard telephone numbers, The SIP manager 514 maps the call id to an actual telephone line on the telephony board 306. The SIP manager 514 uses the SIP message type to determine an appropriate event for the telephony board 306 for example, a SIP BYE message would result in a 'hang up' event for the telephony board 306.

The conversion from PCM to RTP happens as follows: for an incoming stream of media, the telephony board 306 receives the PCM data that contains G.711 data multiplexed into a number of channels. Preferably the telephony board 306 separates the G.711 data associated with a particular phone line from the formatting that describes the multiplexing. The telephony board 306 passes that data on to the endpoint manager 504 which packages the G.711 data into packets that can be transmitted using RTP. That packaged data is then sent through the G.711 transmitter 510 to the application 312.

For an out-going media stream, the process is reciprocal. The endpoint manager 504 removes the RTP structuring and sends the G.711 data to the telephony board which packages it for multiplexing out over the standard phone line.

Figure 10:
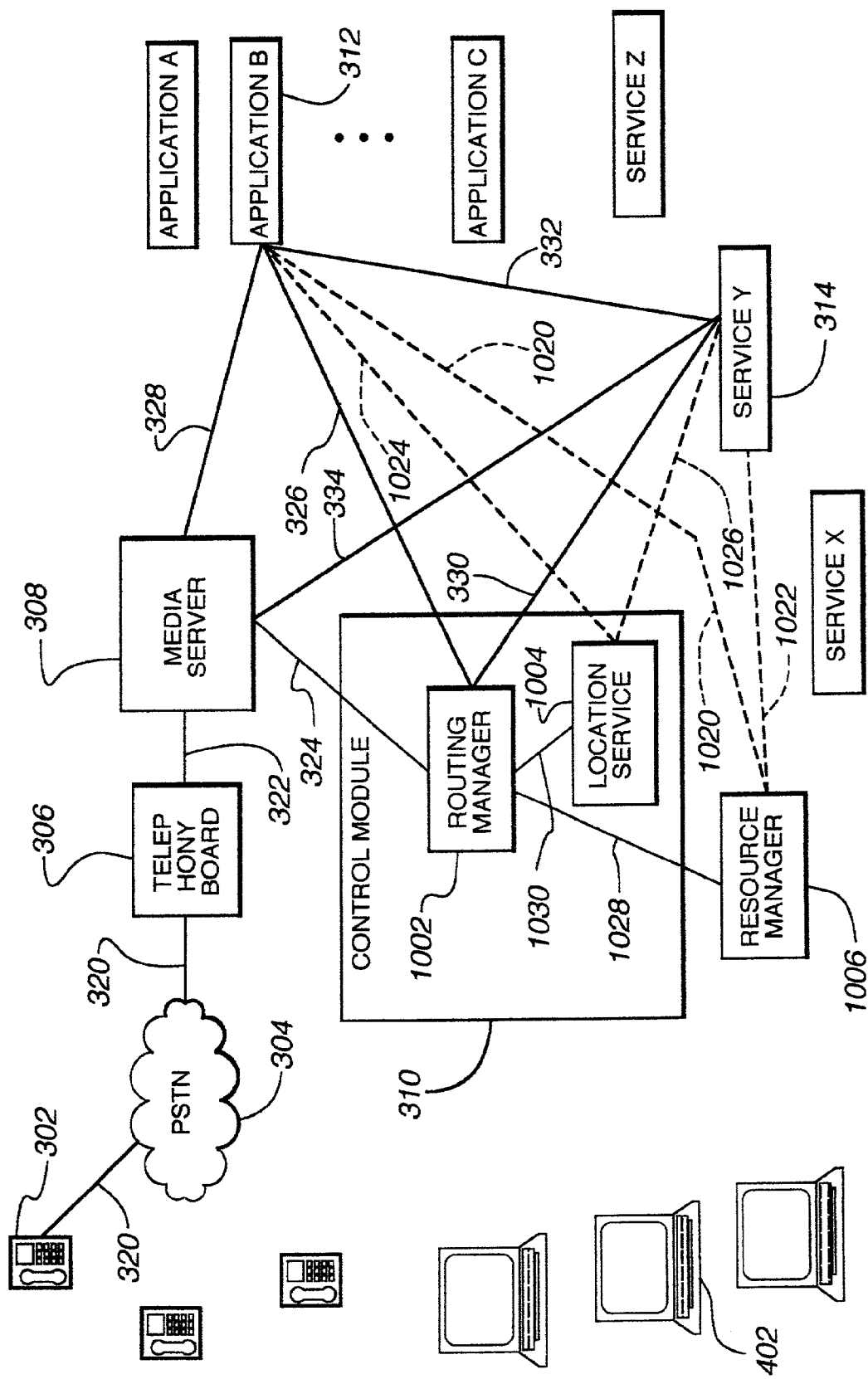
FIG. 10 is a diagrammatic representation of the control module 310 shown in FIG. 3.

FIG. 10 shows an internal architecture 1000 for the control module 310 in accordance with one embodiment of the present invention. FIG. 10 is identical in all aspects to FIG. 3, with an expanded view of the control module 310. While the architecture 1000 could have been shown with reference to FIG. 4 using the SIP enabled calling device 402, the control module 310 operates substantially similar, therefore, the internal architecture 1000 will only be explained with respect to accessing the application 312 using a standard telephone 302.

FIG. 10 includes the same components as architecture 300 shown in FIG. 3: the caller 302, the telephony board 306 (which provides an interface between PSTN 304 and the media server 308), the media server 308, the control module 310, applications 312 and services 314. The expanded view of the control module 310 depicts the interactions between its sub-components, the routing manager 1002 and location service 1004, and resource manager 1006. In other words, FIG. 10 illustrates the placing of a call over the standard PSTN to an application residing within a server in accordance with the present invention with a detailed focus on the internal routing functions of the control module 310.

In operation, applications 312 and service programs 314 are both started by the process monitoring system 1200 (explained in more detail below in-conjunction with FIGS. 12 and 13) in accordance with conventional system configuration specifications as discussed below. After applications 312 and service programs 314 have started, the applications 312 register with the location service 1004 by sending a signal over communication channel 1024 and the service programs 314 register with the location service 1004 by sending a signal over communication channel 1026. Preferably, the location service 1004 uses these signals to update and maintain a database containing several information fields in a look-up style table. Preferably, two fields in location service 1004 are an application type field and a URL address field. Thus, as will be explained in more detail below, routing manager 1002 can access location service 1004 to determine the IP addresses of those applications 312 and service programs 314.

As specific instances of applications 312 (such as application 312 types A, B or C) and service programs 314 (such as service programs 314 types X, Y or Z) are used, activity information is communicated to a process monitoring service 1200 (explained in more detail below in-conjunction with FIGS. 12 and 13). The process monitoring service 1200 uses this information for multiple purposes. One such purpose is to make hardware and software utilization information available (via the resource manager 1006 interface) to the routing manager 1002 so that the routing manager 1002 can assign resources to optimize how the system uses the resources.

As shown in FIG. 10, when a caller uses telephone 302 to access one of the applications 312, PSTN 304 routes the call through the telephony board 306 to the media server 308, which performs protocol translations as discussed in conjunction with FIGS. 5–9, and forwards the SIP application INVITE to the control module 310. The control module 310 performs protocol handling (i.e., handshaking) and the routing manager 1002 receives the SIP application INVITE request.

Note that the routing manager 1002 and the Location Service 1004 are depicted in FIG. 10 as sub-components of the control module 310 but that their relationship in practice is a matter of design and they could be rendered in different ways both internal or external to the control module 310. Similarly, resource manager 1006 is shown external to control module 310 but could be internal to control module 310 as a matter of design choice.

Note also that the routing manager 1002 is presented in FIG. 10 as a single entity. In fact, the routing manager 1002 specifies an Application Programming Interface (API) that can be used to implement different types of routing managers 1002 with different capabilities. These routing managers can take a wide variety of forms.

Figure 1:
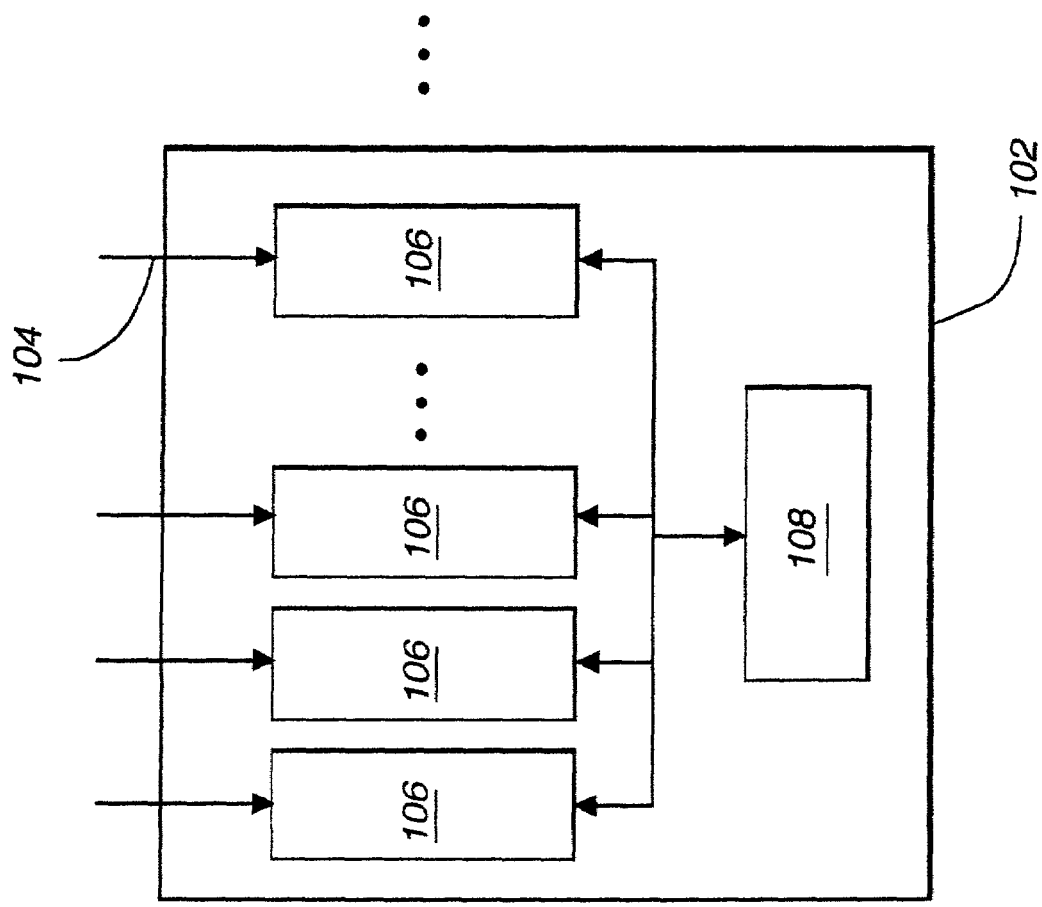
FIG. 1 is a diagrammatic representation of a conventional system for distributing service programs.
Figure 1:
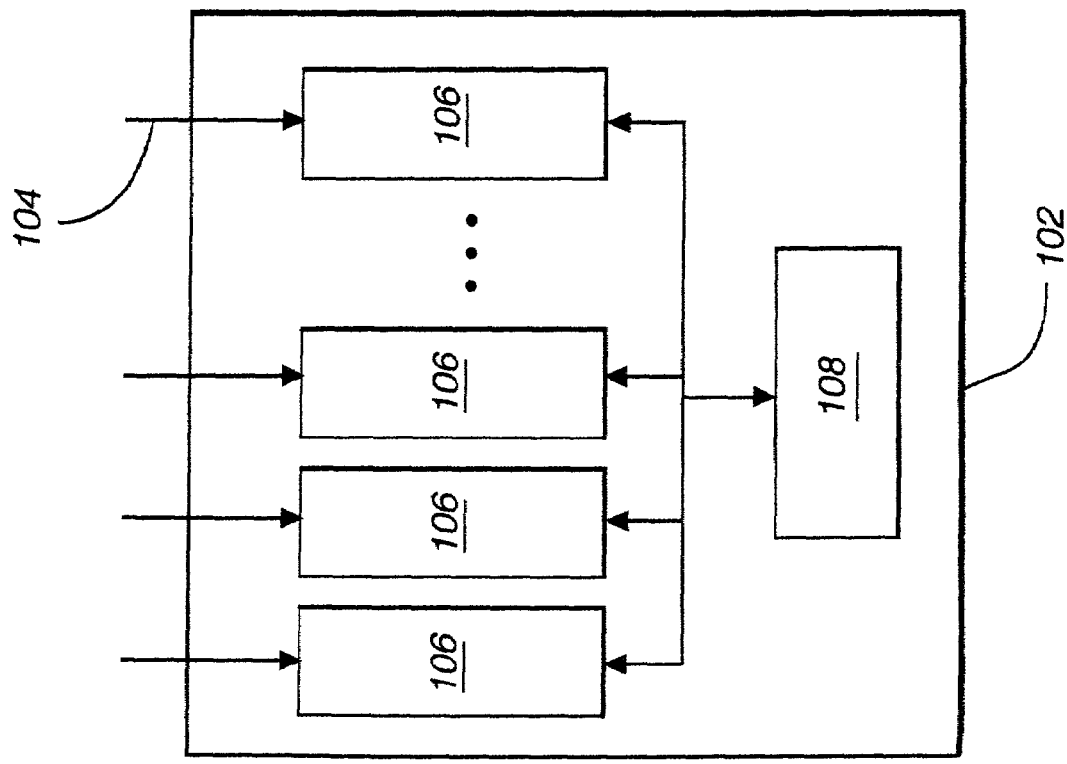
Figure 2:
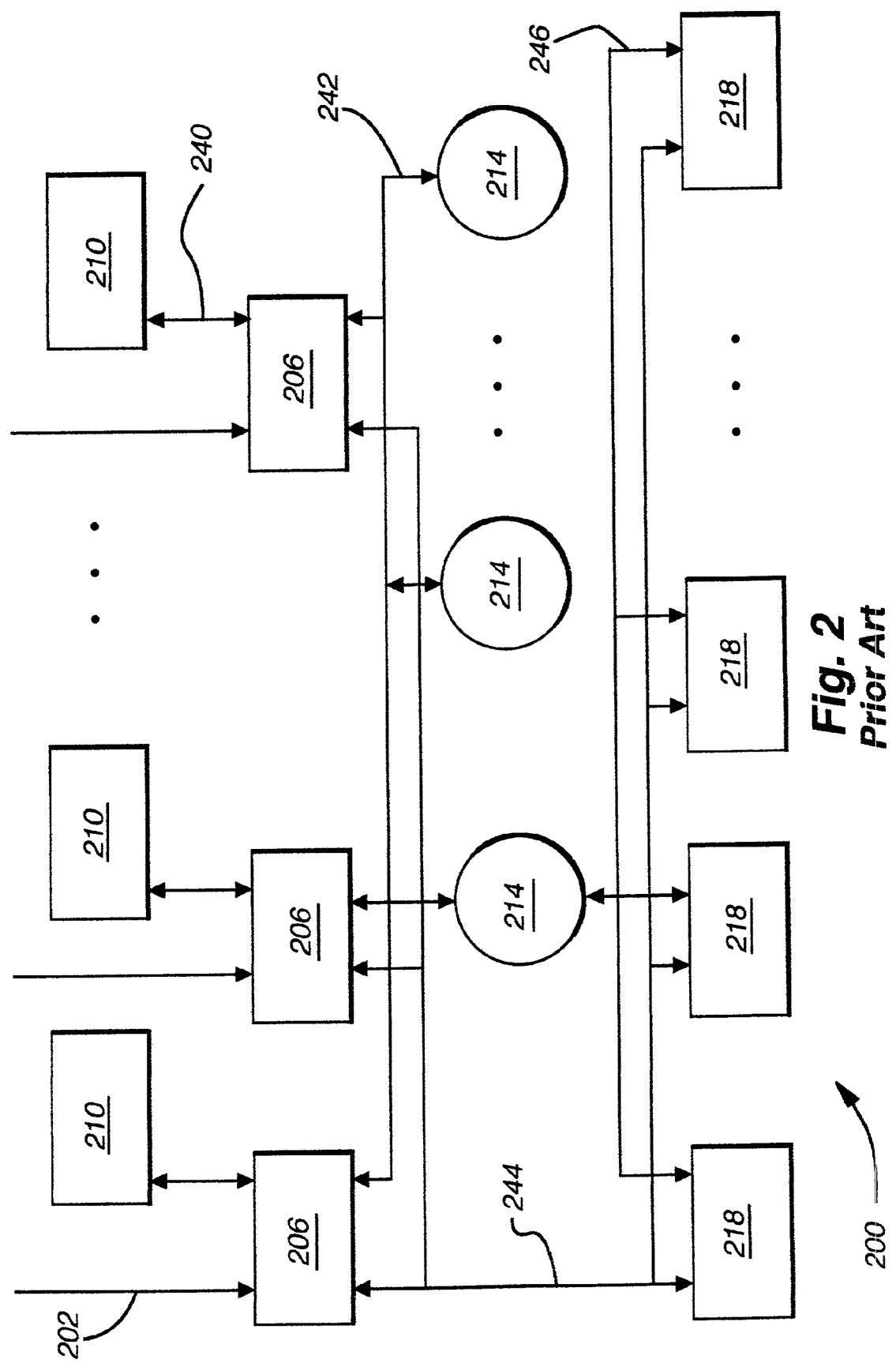
FIG. 2 is a diagrammatic representation of a conventional speech recognition system.

One type of routing manager 1002 could implement a simple round robin algorithm for resource allocation of both application 312 and service programs 314, similar to the load balancing of the prior art system in FIG. 1. Another could use a routing algorithm specialized for speech applications like the prior art system in FIG. 2. This might incorporate information about the grammar required to process an utterance, the processing capabilities of different speech recognition servers for that grammar, and the available capacity of each speech recognition server. Note that a routing manager 1002 using the strategies described for FIG. 2 would only be able to route requests for service programs 314 and would not be able to route requests for applications 312, as would the present invention.

Another type of routing manager 1002 that could be implemented using the routing manager API could use information accumulated by the process monitoring system 1200 described in FIGS. 12 and 13, explained in more detail below. FIG. 10 illustrates this type of routing manager 1002 that interacts with a resource manager 1006 that is an interface to the information collected by the process management system 1200. However, upon reading the disclosure of the present invention, one of ordinary skill in the art would find it possible to create many different routing algorithms for balancing both applications 312 and service programs 314.

After the control module 310 performs protocol handling, the routing manager 1002 receives the request and determines that, for example, the caller 302 is requesting an instance of application 312 type B. The routing manager 1002 uses its routing algorithm and information garnered from the process monitoring system 1200, explained below, to determine what instance of application 312 type B, which is registered with location service 1004, to route the call to. Once routing manager 1002 determines the particular application 312 type B, routing manager 1002 uses the IP address information contained in location service 1004 to route the SIP application INVITE to that particular application 312 type B over communication channel 326. As indicated above, different versions of the routing manager 1002 developed in accordance with the routing manager API will use different strategies for making this determination.

The routing manager 1002 uses the detailed hardware and software utilization information accumulated by the process monitoring service 1200 by consulting the resource manager 1006 over communication link 1028. The resource manager 1006, upon consultation by routing manager 1002, packages the hardware and software utilization information for monitored instances of applications 312 type B and sends the information to routing manager 1002. The routing manager 1002 determines, based on the information sent from resource manager 1006, the specific instance of application 312 type B to forward the request to. It is preferable to use both hardware and software utilization information in assigning resources. A particular instance of application 312 type B, for example, may be available but it may reside on a hardware box that is heavily utilized and so has minimal memory, CPU cycles and other hardware resources. A second instance of application 312 type B may be available and it may reside on a hardware box that is only lightly utilized. It would be preferable in this example to route the request to the second instance of application 312 type B. When the routing manager 1002 has determined the specific instance of application 312 type B that is appropriate to handle the request, it consults the location service 1004 over link 1030 to determine the IP (Internet Protocol) address and port number of that specific application 312 type B. Once it has the IP address and port number, it returns that address and port number to the control module 310, which forwards the SIP application INVITE to the identified application 312 type B.

A similar process occurs when one of the applications 312 requests access to one of the service programs 314. The SIP service INVITE is sent along communication channel 326 to the control module 310, which handles the protocol translation, and hands the request to the routing manager 1002. The routing manager 1002 establishes the type of service program 314 being requested, for example, service program 314 type Y. The routing manager 1002 uses its routing algorithm to identify and route the SIP service INVITE in a manner similar to the procedure described above in association with the application 312.

In particular, the routing manager 1002 uses the detailed hardware and software utilization information accumulated by the process monitoring service 1200. To obtain the hardware and software utilization information, routing manager 1002 consults with the resource manager 1006 over communication link 1028 to identify a specific instance of service program 314 type Y to forward the request to. On consultation, the resource manager 1006 provides information regarding the hardware and software utilization information concerning the monitored instances of service program 314 type Y back to the routing manager 1002 and the routing manager 1002 determines the specific instance of service program 314 type Y to forward the request to.

When the routing manager 1002 determines the specific instance of service program 314 type Y that is appropriate to handle the request, routing manager 1002 consults the location service 1004 over link 1030 to find out the IP (Internet Protocol) address of that specific service program 314 type Y. Once routing manager 1002 has the IP address, it returns that to the control module 310 and control module 310 forwards the SIP service INVITE to that instance of service program 314 type Y.

The unique system architecture (as shown by FIGS. 3, 4, and 10) of the present invention allows fewer service programs 314 to service requests from a greater or equal number of applications 312 than current implementations, especially in the speech recognition field. For example, service program 314 type Y could provide services to multiple applications 312 type B or multiple applications 312 of different types, such as providing services to types A and B substantially simultaneously. In order to accomplish this feature, a multiplexing component is needed to allow the service programs to interact with multiple application programs and calling devices.

FIG. 11 shows one possible multiplexing architecture 1100 depicting the multiplexing capability in accordance with one embodiment of the present invention. Preferably, the multiplexing architecture 1100 is implemented in the service programs 314 so that they can be multiplexed as described above. Architecture 1100 includes clients 1102 and at least one service component 1124. The clients 1102 may correspond to local or remote applications 312 residing within a server in accordance with one embodiment of the present invention or may correspond to other types of local or remote applications external to such a server.

The service component 1124 corresponds to service programs 314 from FIGS. 3, 4 and 10. The service component 1124 contains within it a SIP user agent 1104, a virtual port manager 1106, a process queue manager 1112, a service platform specific API (Application Programmer Interface) 1120 and a service platform 1122. The service platform 1122 performs the actual service and could be provided by any appropriate source, including servers located in systems accessed over the Internet.

In terms of FIG. 3, for instance, FIG. 11 illustrates the request by an application 312 for a service from a service program 314 and the fulfillment of that request, both using the SIP protocol and a queue-based multiplexing strategy. The request and its fulfillment are typically made in the context of a server in accordance with the present invention. A client 1102 could be an application residing within a server in accordance with the present invention. Alternatively, however, client 1102 could be an external application that accesses the server where service component 1124 resides when it requires a service.

While each piece of architecture 1100 is shown as being separate and distinct, the individual pieces could be contained in one processing unit, such as a single server, or many processing units as a matter of design choice. Additionally, the pieces could be located in one central location or spread over a multitude of remote locations. A typical use is for clients to be in one set of locations on one set of hardware while the services are in other locations on other hardware.

In operation, the service component 1124 has a number of ports (not specifically shown), each of which connects to one of the plurality of clients 1102 as needed. The service component 1124 likewise has a separate number of communication channels that connect to the service platform 1122.

The service component 1124 is configured at start-up to manage a set of ports for client 1102 interaction and a separate set of communication channels with the service platform 1122. Preferably, service component 1124 has many more ports to client 1102 than communication channels to service platform 1122. The service platform 1122 uses a single communication channel to process one request at a time. Thus, service component 1124 queues requests or inputs from the client 1102 until a communication channel for the service platform 1122 becomes available. The service component 1124 queues the input from the client 1102 in a cache memory 1114 input queue located in the process queue manager 1112. Preferably, the memory is a FIFO style queuing system, but could be other styles such as, FILO etc. Similarly, output from the service platform 1122 is queued in a cache memory 1116 output queue located in the process queue manager 1112 prior to being sent back to the port manager 1106 en route to the requesting clients 1102.

Separating communication ports with the plurality of clients 1102 from communication channels with the service platform 1122 allows the service component 1124 to handle a number of input requests which exceeds the service platform 1122's capacity—i.e., more clients 1102 can simultaneously request services than the service platform 1122 has available channels. The excess number of client 1102 requests above the number of communication channels to the service platform 1122 are queued until the service platform 1122 completes a request and thereby frees up a communication channel to accept one of the queued requests.

In operation, one of the plurality of clients 1102 makes a request for a particular service program whose program resides on service platform 1122. Client 1102 makes the request by composing and sending a SIP service INVITE to control module 310. After appropriate routing (as discussed in FIGS. 3, 4 and 10), the request is forwarded over communication channel 1140 to the SIP user agent 1104 located in the service component 1124. As one of skill in the art would recognize, the task of the SIP user agent 1104 is to negotiate the communication between the requesting client 1102 and the service component 1124. To do this, it first determines whether there is an available port process 1108. If there is not, it refuses the SIP service INVITE.

If there is an available port process 1108, the SIP user agent 1104 sends a message over communication channel 1142 to the port process 1108 telling it to establish communication channels 1146 and 1144 back to the requesting client 1102, which provided its address information to the SIP user agent 1104 in the SIP service INVITE. In many but not all cases, for port process 1108 illustrated in FIG. 11, two sets of communication channels are established for each connection between the client 1102 and the port process 1108. These communication channels comprise channel 1146 for media type 1 (MT 1) and 1144 for media type 2 (MT 2). Typically but not necessarily, one of these communication channels will be used for input coming from the client 1102 to the service component 1124. This establishes comprehensive two-way communication and media flow between the requesting client 1102 and port process 1108. Preferably, the media types correspond to the service requested by client 1102 and the service provided by service platform 1122, but interfaces could be provided to appropriately transform the media types if the media types did not correspond.

In other embodiments, arbitrary numbers of communication channels could be established between the requesting client 1102 and the port process 1108. Two sets of communication channels are useful in the following example as depicted for port process 1108a: the requesting client 1102 is a speech related application invoked by a caller dialing into a server in accordance with the present invention. The service platform 1122 provides text to speech services (TSS). One communication channel 1144a uses Transmission Control Protocol (TCP) to send text to the service component while the other set of communication channels 1246a uses RTP and Realtime Transport Control Protocol (RTCP) to send audio back to the requesting client 1102.

Two sets of communication channels are also useful when the service is a voice recognition server. In this case, which is not illustrated in FIG. 11, the pair of RTP/RTCP communication channels are used for voice input coming to the service component 1124 while the TCP communication channel is used for text output going back to the requesting client 1102.

Note also that the different sets of communication channels for a given port process do not necessarily have to connect to the requesting client 1102. In this example, the text to be input might come from the requesting client 1102 (a speech related application) but the audio output (from the text to speech generation service 1122) might be sent directly back to the caller (not shown in FIG. 11, but represented in FIGS. 3, 4 and 10 as caller 302).

Once the communication channels have been established, the port process 1108 may need additional input to perform the service. If so, it waits until it receives input over an input communication channel 1144. In the example where the service platform 1122 provides a text to speech service, the input is ASCII text, which is only sent after the communications ports are properly established. In the example where the service component 1124 provides voice recognition service, the input is an audio stream, which is only sent after the communications ports are properly established. In other examples, input and output media types will vary.

When the port process 1108 has everything it needs for the request, it creates a request object, not shown, with sufficient information for the service platform 1122 to fulfill the request and send the result back to the appropriate port process 1108 for routing to the requesting client 1102, or calling device 302, for example.

The port process 1108 places the request object on the input queue 1114. Worker Threads (WT) 1118 are responsible for back end coordination with the service platform 1122. When a Worker Thread 1118 is free, it checks the input queue 1114 for pending request objects. If the WT 1118 finds a request object, WT 1118 removes the request object from the input queue 1114 and uses the information within to forward the request to the service platform 1122.

Within the architecture of a server in accordance with the present invention, the service platform 1122 can provide any type of service. For speech applications this could be a voice recognition service, a text to speech service, a Voice extensible Markup Language (VXML) script server, a voice prompt service, or other services. For other types of applications there would be a comparable list of services.

The multiplexing architecture 1100 is general and almost any type of service program can used architecture 1100. Consequently, one preferred embodiment of the multiplexing architecture 1100 contains a service platform specific API 1120 sub-component. Service platform specific API 1120 provides a means for the general multiplexing architecture 1100 to interact with any specific service platform 1122. The service platform specific API 1120 performs any data transformations, communications or other operations required to interact with the service platform 1122.

The WT 1118 uses the service platform specific API 1120 to make the request of the service platform 1122. When the service platform 1122 completes handling the request, it returns a result to the WT 1118. While WT 1118 could direct the result back to the originating port process 1108, it is possible for WT 1118 to package the result appropriately and put the result in the output queue 1114. However, the output queue is not necessary. A return thread sleeps on the output queue 1116, wakes up when something is put in the output queue 1116 and removes the result from the output queue 1116 and gives the result to the originating port process 1108. Use of the output queue 1116 is typical not required because inputs are typically more numerous then outputs resulting in the ability to directly pass output results to the port process 1108 of the originating request.

The originating port process 1108 sends the result to the output destination over communication channel 1146. The output destination could be the requesting client 1102 as illustrated in FIG. 11 or, in the telephony context, it could be the calling device 302, or in the IP context, it could the SIP enabled device 402, that contacted the requesting client 1102 in the first place.

Figure 12:
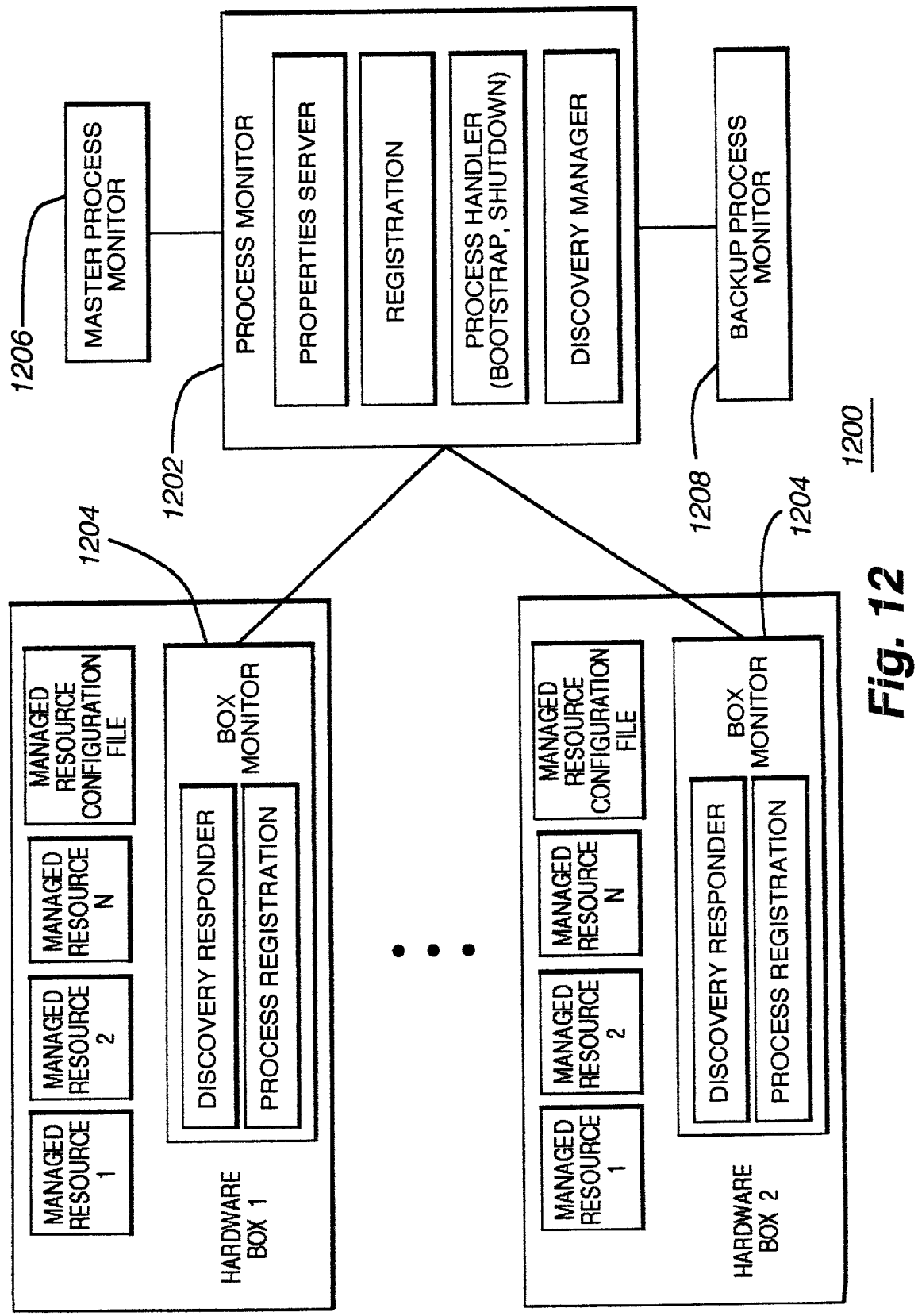
FIG. 12 is a diagrammatic representation of a process monitor service consistent with the present invention.

FIG. 12 shows a process monitoring service 1200. The process monitoring service 1200 is a distributed function that coordinates availability and operation of resources throughout a server in accordance with the present invention. The process monitoring service 1200 has two major components, a process monitor 1202 and a box monitor 1204, that control other components. Preferably, the process monitor 1202 resides on the same hardware box as or on a hardware box in close proximity to the control module 310 and box monitors 1204 resides on every hardware box in the server.

The process monitoring service 1200 can monitor multiple software processes running on multiple servers. It coordinates availability of resources by providing a means for statically and dynamically configuring what software process run on which hardware boxes. Based on initialization information, the process monitor 1202 can tell a box monitor 1204 on a specific hardware box to load and start particular software processes.

Also, while monitoring how the software processes are being used and how much processing capacity is being demanded of the server, the process monitor 1202 can instruct a box monitor 1204 to load and start new processes if there is excess demand or to shut down processes if there is excess capacity. The starting and stopping use system configuration files (not shown, but generally known in the art). The ability to shut down particular processes might be useful, for example, when more instances of a particular resource A have been started on a given hardware box than are currently being used and fewer instances of a different resource B have been started on that same hardware box than are currently needed. In this case, the process monitor 1202 would instruct the box monitor 1204 for that hardware box to shut down some instances of resource A and to start up some additional instances of resource B.

The process monitoring service 1200 also enhances system reliability by monitoring process status and providing fail-over capability. When processes fail or operate inappropriately, the process monitoring service 1200 can re-start them. Its hierarchical clustering structure, described below, enables systems to scale to very large numbers of hardware and software resources.

The process monitoring service 1200 monitors operation of the hardware boxes themselves and so enables hardware management.

The process monitoring service 1200 provides the ability to update and maintain software. If a particular software package needs to be updated, for example, the process monitor 1202 can instruct all box monitors 1204 running instances of that software package to shut down those instances. This shut down can be immediate or, by letting the processes complete their current tasks but not letting any new tasks start, it can be graceful. Once all instances of the software process have been terminated on a particular box, the new version of that software package can be loaded on that box and instances of the new version can be started.

Similarly, the process monitoring service 1200 provides the ability to update and maintain hardware. A particular hardware box may need to be taken out of service, for example, to be replaced by a more capable hardware box or in order to have its memory or other components upgraded or repaired. The process monitor 1202 can instruct the box monitor 1204 for that hardware box to immediately or gracefully (i.e., complete ongoing processes) shut down all software processes on that hardware box. Once all software processes on that hardware box have been shut down, the hardware box can be taken out of service for upgrade or repair.

The process monitoring service 1200 preferably includes a backup process monitor for fail-over, which makes it a highly reliable process management system. Each process monitor 1202 has an associated backup process monitor 1208. In addition, the master process monitor 1206 also has an associated backup process monitor 1308.

The process monitoring service 1200 is structured hierarchically into clusters. Each cluster, shown in FIG. 13 as Clusters $1301_1$ to $1301_n$, preferably, contains at least one process monitor 1202 that monitors a plurality of box monitors 1204. Preferably, each process monitor 1202 and each box monitor 1204 is a separate processing unit. These process monitors 1202 and box monitors 1204 can be on separate servers or incorporated into a single server, however. Process monitors 1202 and box monitors 1204 provide the means of monitoring and accessing managed resources.

Managed resources, shown as managed resources 1, 2 . . . N in FIG. 12, and Box 1 Process 1, . . . Box 1 Process N, etc., in FIG. 13, are software processes that can provide (1) status information for monitoring purposes and (2) actions the managed resources can be directed to perform. For example, box monitor 1204 in hardware box 1 (FIG. 12) has access to managed resources 1, 2, . . . N in hardware box 1 (FIG. 12). Managed resources can include any software or hardware resource used by applications or service programs residing in a server in accordance with one embodiment of the present invention. For speech related applications, these managed resources can include speech specific resources such as voice recognition services, text to speech generation services and prompt services, as well as platform services and top level resource management services such as the process monitor 1202 and box monitor 1204 themselves.

Preferably, a single instance of a box monitor 1204 is deployed on each physical box that is equipped with resources to manage. A box monitor 1204 is essentially a passive manager. It responds to requests from its managing process monitor 1202. The process monitor 1202 requests status reports on box monitor 1204 managed resources, and directs the box monitor 1204 to take actions to manage its resources, starting up resources, shutting down resources, launching resources. Preferably, the box monitor 1204 reports to the process monitor 1202 on short periodic intervals but the interval length is largely a matter of design choice.

Preferably, one process monitor 1202 is installed on a server separate from the plurality of box monitors 1204 (although some functions of the process monitor 1202 may be distributed). One of skill in the art would now recognize that one process monitor 1202 could be installed on a server having one box monitor 1204, installed on one its own stand-alone server, or be programmed into several coordinated servers. The process monitor 1202 issues appropriate instructions to a box monitor 1204 based on the box monitor's 1204 type, its configuration file and the information the box monitor 1204 reports.

To initially locate box monitors 1204, the process monitor 1202 preferably uses multicast IP messages. Preferably, subsequent communication between the process monitor 1202 and its box monitors 1204 uses HTTP and HTTPS protocols; however, other communication protocols could be used as well.

As discussed above, the process monitoring service 1200 uses a hierarchical reporting model that incorporates the notion of clusters. FIG. 13 illustrates the hierarchical structure of the clusters. Encompassing clusters, such as encompassing cluster 1302, are logical groups of a plurality of clusters $1301_1$ to $1301_n$. Preferably, a logical group cluster consists of a two level hierarchy: the process monitor 1202 and the box monitors 1204 the process monitor 1202 manages. In smaller scale embodiments of the present invention, a typical cluster may consist of a single process monitor 1202 and its managed box monitors 1204. As shown in FIG. 13, encompassing cluster 1302 includes a master process monitor 1206, a backup master process monitor 1308 which provides fail-over capability, a plurality of process monitors $1202_1$ to $1202_n$ for clusters $1301_1$ to $1301_n$, and a plurality of box monitors 1204 for each hardware box (not specifically labeled) in each of the clusters $1301_1$ to $1301_n$. In cluster $1301_1$, process monitor 1 ($1202_1$) monitors box monitors 1 to N on hardware box 1, hardware box 2, . . . hardware box N.

Figure 13:
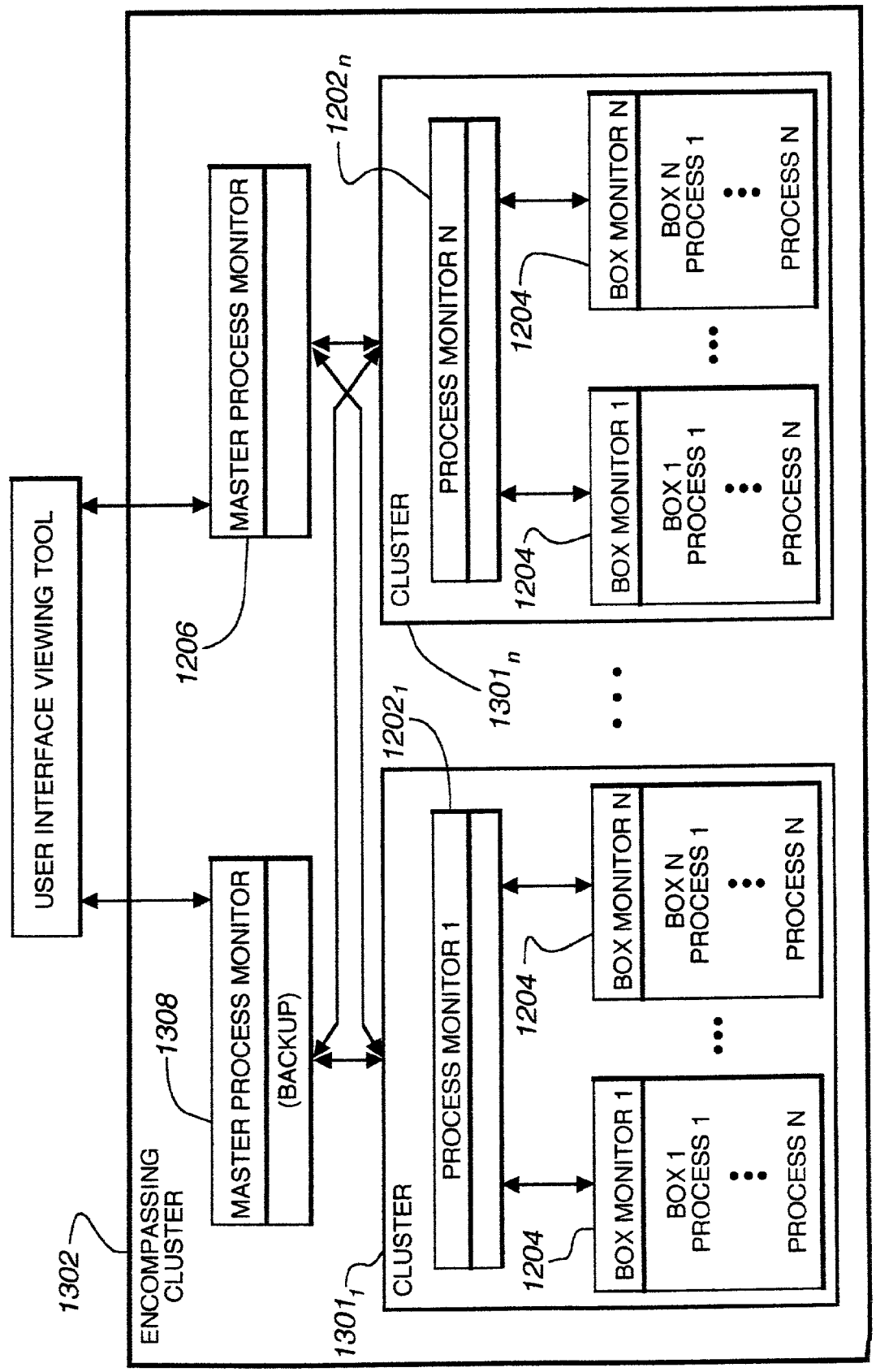
FIG. 13 is a diagrammatic representation of interaction between process monitors and box monitors shown in FIG. 12.

As shown in FIG. 13, a single master process monitor 1206 exists for all clusters in the network designed in accordance with one embodiment of the present invention. Of course, one of skill in the art will now recognize that multiple layers of process monitors could expand system management. For example, a single super master process monitor could exist as a management layer above a set of master process monitors 1206. Each cluster has its own process monitor 1202, backup process monitor (not shown) and plurality of box monitors 1204. The box monitor 1204 manages an individual server in a cluster. Alternatively, each box monitor 1204 could be designated a portion of one server to monitor particular resources assigned to that portion of the server, or box monitor 1204 monitors could be assigned managed resources over several servers. Each box monitor 1204 in the encompassing cluster 1302 reports to its process monitor 1202 which in turn, reports to the master process monitor 1206. Data reported by the box monitors 1204 and process monitors 1202 is provided at and passed up through each level of the hierarchy. This aggregated data is available for viewing in an appropriate user interface tool or graphical user interface as discussed below.

As explained above in connection with FIG. 12, the box monitor 1204 manages resources on a server component of a platform in accordance with one embodiment of the present invention. Managed resources are software processes that provide status information or make available actions they can be directed to perform. While box monitors 1204 could be designed to perform some processing of information, it is preferable that box monitors 1204 are passive agents that know no specifics about the processes they manage and instead report to and receive directives from a managing process monitor 1202.

The process monitoring service 1200 relies on box monitors 1204 and process monitors 1202 starting when the box they are installed on is booted. For example, hardware box 1 in FIG. 12 could be initially shut off. Process monitor 1202 would not register hardware box 1 and therefore, hardware box 1 would not report nor would it be directed to initiate an application or a service program. When hardware box 1 is started up, box monitor 1204 notifies process monitor 1202 (which may notify a master process monitor 1206 if one exits in the configuration, etc). Process monitor 1202 (or master process monitor 1206) registers the information with location service 1004. Similarly, utilization information for processes monitored by box monitors 1204, process monitors 1202 and master process monitor(s) 1206 is accessible by resource manager 1006 and can be used by a version of routing manager 1002 to determine the instances of applications and services to which particular requests should be directed.

Similarly, if the entire cluster is down, when it is booted, process monitor 1202 registers with the master process monitor 1206 in a manner similar to the manner in which the box monitor 1204 registers with process monitor 1202 as described below.

In order to perform bootstrap activities when it is started, the box monitor 1204 uses initialization parameters that specify available communication ports, IP address, and its agent type. Preferably, a box monitor 1204 uses default initialization values unless new values are specified on the command line at run time.

After startup, the box monitor 1204 listens for a "who is here?" discovery query broadcast periodically by the cluster's process monitor 1202. As stated above, preferably this discovery query is sent as a multi-cast IP message. When the box monitor 1204 receives this message, it sends the process monitor 1202 a discovery response. The process monitor 1202 uses the information in the box monitor 1204's discovery response message to register the box monitor 1204 as active in the cluster, and loads a resource configuration file specific to the box monitor 1204's reported type. Note that registration with the process monitor 1202 only occurs once. The box monitor 1204 then waits for directives from the managing process monitor 1202.

Generally, the box monitor 1204 performs three functions on the box it manages: (1) it executes actions on managed resources, (2) it reports status of managed resources, and (3) it handles notifications sent by managed resources.

The monitoring services provided by a particular box monitor 1204 depend on the operating system and software components deployed on its box. In this way, box monitors 1204 can be categorized by their type. Each box monitor 1204 type has an associated managed resource configuration file.

Information about the resources a box monitor 1204 can manage is stored in its configuration file. Managed resource configuration files typically contain information about two types of resources: startup scripts and monitored processes. The box monitor 1204 does not access the information in its configuration file directly. Rather, its managing process monitor 1202 uses the information in the managed resource configuration file to direct the box monitor 1204 to perform certain ordered tasks. These tasks include executing scripts and loading and starting managed resource components or descriptors (not shown), which provide a link to a box monitor 1204's managed resources.

The process monitor 1202 functions as the focal point for network management processing in a cluster. As discussed above, the process monitor 1202 dynamically finds box monitors 1204 within its cluster 1301 by periodically broadcasting a "who is here?" query, preferably as a multicast IP message. From the perspective of the process monitor 1202, the box monitors 1204 in its cluster are themselves managed resources. Like the box monitors 1204, the process monitor 1202 is started when the hardware box it is on is booted. In order to perform bootstrap activities, the process monitor 1202 uses initialization parameters that specify available communication ports, IP addresses, time outs and other behaviors. Preferably, a process monitor 1202 uses default initialization values unless new values are specified on the command line at run time.

After startup, a process monitor 1202 reads a master configuration file that identifies known box monitor 1204 types and where to locate their associated managed resource configuration files. In contrast to a box monitor 1204, a process monitor 1202 is an active entity that requests status reports from and sends directives to the box monitors 1204 it manages. When a box monitor 1204 responds to a "who is here?" query, the process monitor 1202 registers that box monitor 1204 as active in its cluster. A box monitor 1204's response identifies its communication channels (preferably IP addresses and ports) and its box monitor 1204 type. In order for the process monitor 1202 to know about the resources a box monitor 1204 can manage, it accesses the configuration file associated with a particular box monitor 1204 type. The process monitor 1202 uses the resources listed in this configuration file to issue an ordered set of actions for the box monitor 1204 to perform.

The process monitor 1202 aggregates data about the box monitors 1204 it manages and their respective managed resources. A data aggregator (not shown) service provides the interface between low-level processes managed by box monitors 1204 and higher-level management entities such as master process monitors 1206 and management viewer applications. The data aggregator (not shown) service has several dimensions. A critical element is that each time a managed resource is started, a managed resource controller (not shown) is created and propagated upward to each level above in the hierarchy. This managed resource controller (not shown) is a proxy object that enables higher-level management entities to obtain information from the managed resource and also to issue directives for it to alter its operation. This proxy object preferably allows methods to be invoked remotely on the managed resource itself.

Every level of the process monitoring hierarchy contains a managed resource controller for every managed resource at or below that level. This enables a management entity at any level to get status information about and control any managed resource at or below that level. Similarly, a management viewer application can open a view on a particular level of the process monitoring hierarchy. From that view, the management viewer application could obtain status information about and control any managed resource at or below that level.

The process monitoring service 1200 includes a notification component (not shown) that is used to notify interested parties about a system alarm. An alarm is raised anytime there is an operation that fails or functions inappropriately in accord with criteria established by the system operator. The notification component (not shown) consists of sub-components responsible for (1) determining that an alarm should be raised (based on user defined criteria), (2) logging the alarm, (3) determining who should be notified about the alarm, and (4) sending notification to recipients identified in step (3). Notification can be sent to a monitoring program to take remediating actions or to a management viewer application for display. Notification can also be sent as an e-mail or page to an operator who can take appropriate action.

The process monitor 1202 fail-over component (not shown) implements two fail-over mechanisms. First, it constantly monitors box monitors 1204 to assure they are in operating order by issuing "are you alive?" broadcasts to the box monitors 1204 it manages. Second, the process monitor 1202 fail-over component insures that a backup instance of the process monitor 1202 (such backups not specifically shown) is always alive and contains up-to-date information such that if the process monitor 1202 were to fail, the backup instances of that process monitor could take over in its place. In the event a process monitor 1202 fails, the backup instance of that process monitor takes over as the primary process monitor 1202 and starts another process monitor 1208 to serve as backup.

The present invention enables the creation of servers that can be used in situations where it is important to track or log the detailed operations of the server as a whole, individual applications and service programs running within the server, and sets of applications and services running within the server. This tracking information can be used to better understand how the server and its constituents are functioning so as to better allocate hardware and software resources. The tracking information can also be used to determine which resources and how much of which resources are used by each application and service or set of applications and services. This resource utilization information can be used, for example, to bill clients and providers of the applications and service programs.

This logging capability has two major dimensions: the logging of information to temporary storage and the transition of the information from temporary storage to persistent storage.

Figure 14:
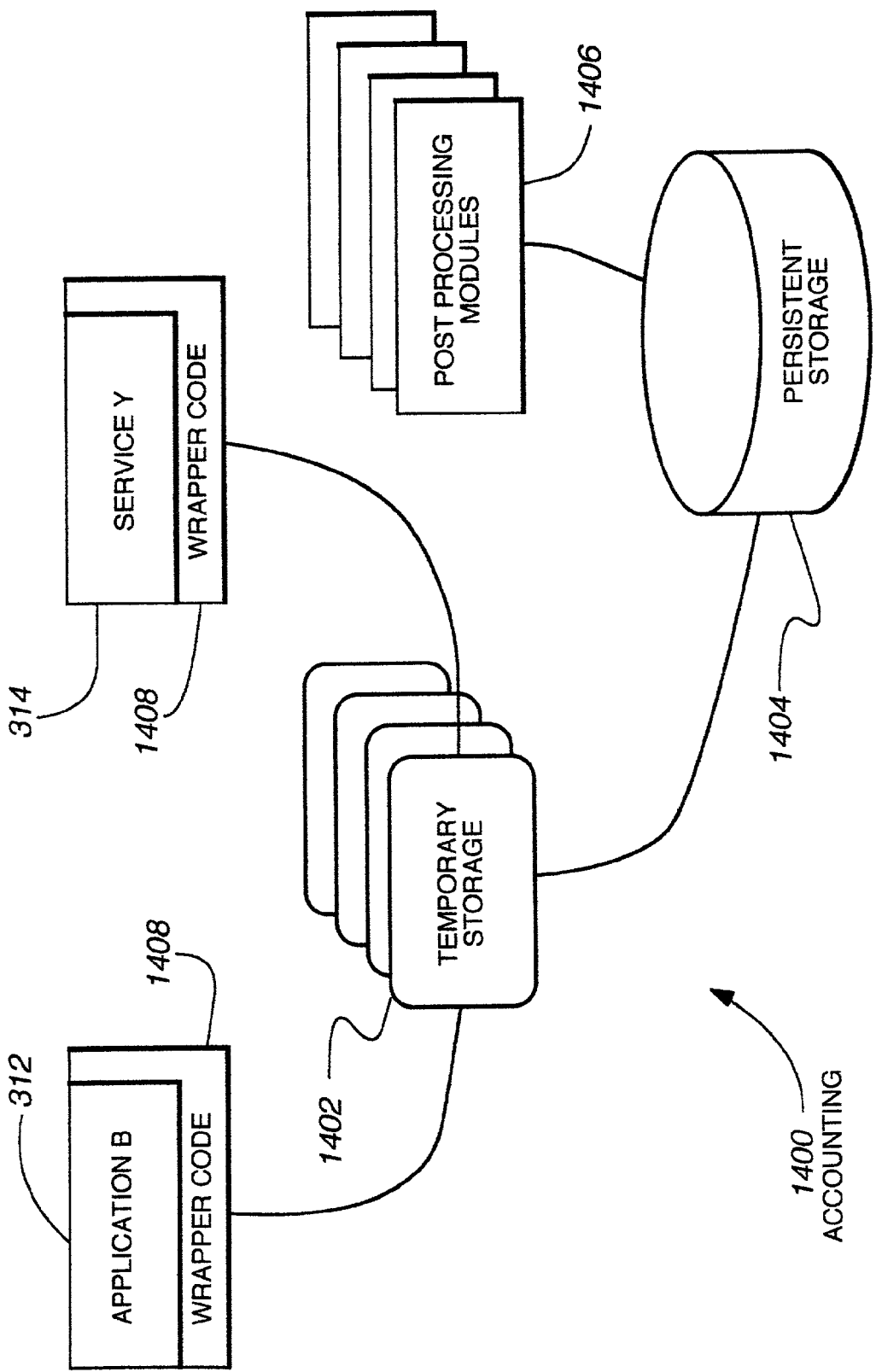
FIG. 14 is a diagrammatic representation of a tracking logging and accounting operation consistent with the present invention.

FIG. 14 illustrates one possible embodiment capable of tracking or logging the operation of a server. FIG. 14 shows a tracking system 1400 that, preferably, includes a temporary storage 1402, a persistent storage 1404 and a plurality of post processing modules 1406. By way of example, FIG. 14 illustrates the tracking of information for application 312 type B and service program 314 type Y (See FIGS. 3, 4, and 10). The tracking or logging of information relating to resource utilization is enabled in the present invention in several ways. Referring back to FIG. 3, for example, the calling device 302 accesses media server 308 that generates and sends a SIP application INVITE to the control module 310 requesting the control module 310 to locate a suitable instance of application 312 type B. As has been explained above, the control module 310 performs standard operations such as finding an available instance of an application 312 type B based on then current resource utilization and other factors. These standard operations are logged for later use by separate post processing analysis modules 1406, which may include third party accounting and other modules.

Within the applications 312 or the service programs 314, there are certain operations that are logged as well. This is accomplished by a set of software programs or wrappers 1408 that wrap invocations of particular operations. When the application 312 type B desires, for example, a text to speech service such as service program 314 type Y, it calls a method on a module embedded in application 312 type B to get that service program 314 type Y. The embedded method is one example of the wrapper code 1408 that first logs the fact that the application 312 type B is requesting the service program 314 type Y in a data field located in temporary storage 1402, and then passes the request for the text to speech service program 314 type Y on as usual.

Often, accounting defines the set of data that must be collected by a server built in accordance with one embodiment of the present invention. Logging is the process of persisting accounting data so that it can be used by later billing and analysis post processing modules 1406. Generally, logging is performed by all SIP-enabled components, including but not limited to the control module 310, the applications 312 and the service programs 314. The initial logging is done to temporary storage 1402 and a separate process aggregates the log data into the persistent storage 1404 for use by decision support tools 1406.

The logging subsystem preferably uses a framework for logging data with different levels of priority. Logging statements are executed in the wrapper code 1408 at logical locations where data should be collected. A given logging statement can be at one of several levels of priority. Preferably, the logging system uses at least four priorities: ERROR, WARN, INFO and DEBUG (listed in decreasing order of priority), but could use more as a design decision. Parameters can then be set that determine which priority levels actually get logged.

Preferably the logging capability consists of three separate dimensions. The first is the logging wrapper code 1408 discussed previously. The code level statements in this wrapper code 1408 write out pertinent data describing the state of affairs in the system should that code segment be executed. The second dimension is temporary storage 1402. The temporary storage mechanism 1402 provides temporary, high-performance and preferably but not necessarily local storage for the above data to be initially logged.

The third dimension is persistence storage 1404. The persistence storage mechanism 1404 will transfer the logged data from the temporary storage 1402 to long-term, reliable persistent storage 1404. Preferably, the logging/tracking information identified by the preprogrammed wrapper code 1408, which will execute on particular events as a matter of design choice, will be stored in flat files while in temporary storage 1402 and in relational databases while in persistent storage 1404. Post processing modules 1406 access the information in the persistent storage 1404 database as required by various conventional billing and analysis programs. The post processing modules 1406 could be part of the existing server networks or separate servers that access the system.

It is preferable to use separate persistent storage 1404 for billing and analysis and an intermediate temporary storage 1402 because when billing and analysis programs access the persistent storage 1404 it will have minimal impact on running applications. Additionally, the tracked or logged data written to temporary storage 1402 by the wrapper codes 1408 can be quickly written out to temporary storage 1402 with minimal performance impact on the running applications. An independent process will on a regular basis move all the data from temporary storage 1402 to the persistent storage 1404.

A key issue is reducing contention among multiple processes that will be logging simultaneously. A preferable solution is to provide a set of multiple log files that can be used by the different processes. Because the temporary storage 1402 is persisted, having multiple temporary log files does not generate inconsistencies: temporal relationships are properly reconstructed when the data is transferred to a persistent repository 1404.

Data can be transferred from multiple, distributed files to a persistent repository 1404 in multiple ways. One approach is to use a single bulk transaction that transfers all data from all files in one operation. Typically, this will lock all log files until every file has been processed and will ensure that the data in the database is current as of a given timestamp. Such currency is frequently not critical, however and this approach can create a performance problem in larger installations since no data can be logged during the transaction because all log files will be locked.

Preferably a series of transactions is used to transfer data from multiple, distributed files in the temporary storage 1402 to corresponding files or database fields in the persistent storage 1404. This approach uses one transaction for each file. Each file is processed individually and is locked only long enough to transfer its data. This allows the system to continue logging to that file immediately after its data is transferred. This entails the least interruption of applications.

The transfer of data to a persistent storage 1404 is preferably scheduled to occur automatically at relatively short intervals, although it is a design decision whether to initiate the transfer automatically or manually and, if automatically, at what interval.

The persistent storage 1404 preferably uses a relational database 1404 to store the logged data. A relational database also provides a standard means for analysis programs to retrieve data for post processing.

Once the data has been transferred to a persistent storage 1404, post-processing modules 1406 use the post-processing framework (not shown) to execute later billing and analysis programs.

As has been explained above, the architectures described herein are based on a TCP/IP system modified to the OSI protocol to better define the session layer and presentation layer, which are not part of the conventional TCP/IP. For clarity, the modification of the conventional TCP/IP system to a TCP/IP system that follows the OSI protocol as explained above, will be re-explained with reference to FIGS. 15–18.

Figure 15:
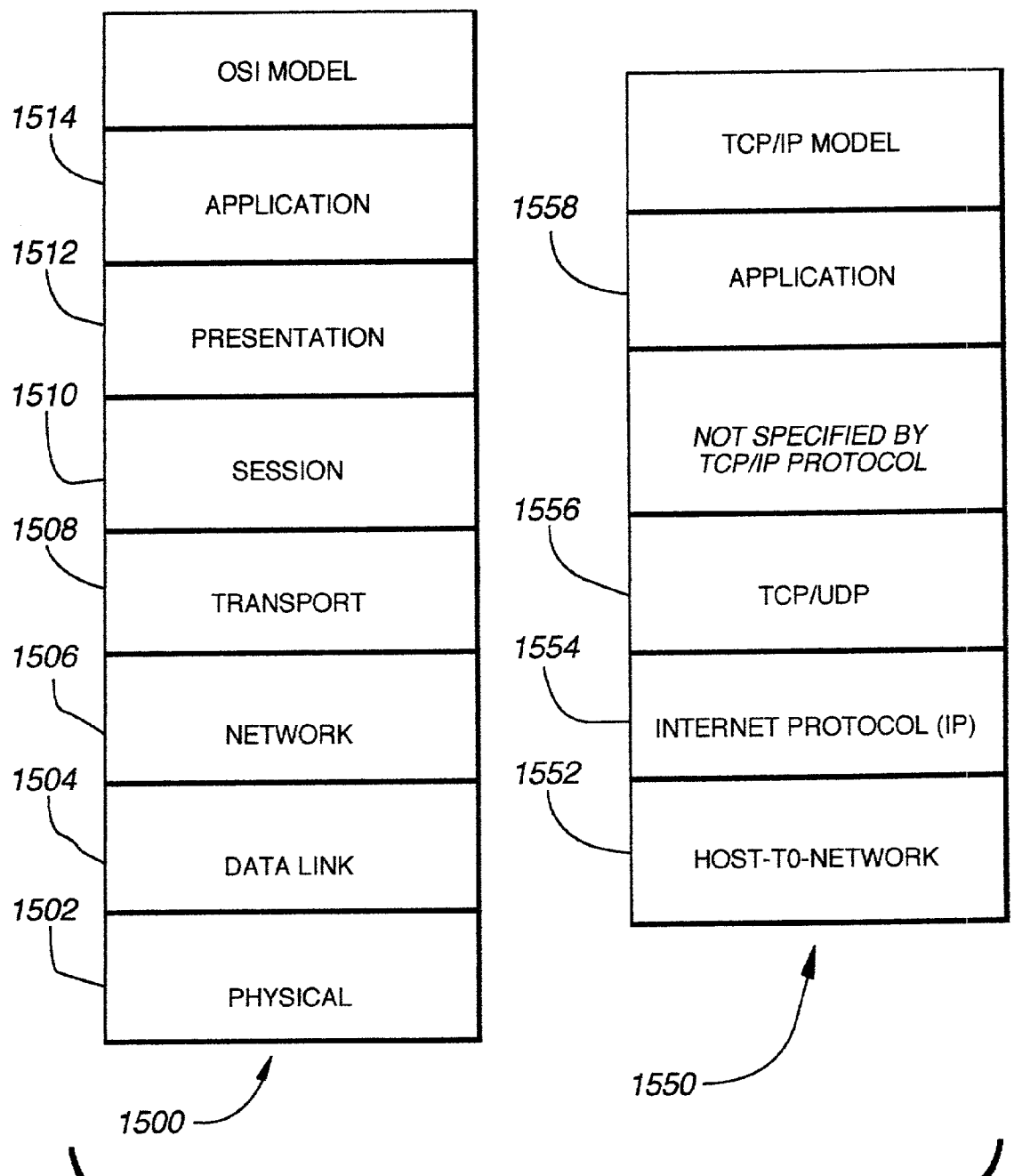
FIG. 15 is a block diagram exemplifying the hierarchy of "OSI" and "TCP/IP"

The OSI protocol defines "host-to-host" communication by establishing a series of layers to perform specific functions. As shown in FIG. 15, the OSI protocol defines a seven layer hierarchical system 1500. System 1500 includes a physical layer 1502, a data link layer 1504, a network layer 1506, a transport layer 1508, a session layer 1510, a presentation layer 1512, and an application layer 1514. FIG. 15 also shows the TCP/IP model 1550. TCP/IP model 1550 generally maps to the OSI system 1500 in the following manner. The physical layer 1502 and data link layer 1504 are combined to the Host-to-Network layer 1552. The network layer 1506 generally equates with the internet protocol (IP) layer 1554. The transport layer 1508 generally equates with the Transmission Control Protocol or User Datagram Protocol (TCP/UDP) layer 1556. The TCP/IP model 1550 generally does not provide an equivalent layer to either the session layer 1510 or presentation layer 1512. The application layer 1514 corresponds to the application layer 1558.

The OSI protocol defines the various layers as follows:

The physical layer 1502 defines the transmission of "bits" or data over a communication channel. Typically, a voltage level is used to delineate between bits of 1 and 0. The physical layer 1502 communicates directly with the communication medium, such as bus work, coax cable, fiber optics, wireless protocols (such as bluetooth).

The data link layer 1504 groups a byte of information into a "frame" and transmits the frame of data without error. Data link layer 1504 may append frames with "start frame" indicators. Moreover, data link layer 1504 may generate a checksum for each frame, which can be used for a number of functions including data verification. Other portions of the data frame may include addresses (both start/source address and destination address), control values for error checking, etc.

The network layer 1506 performs the "packet routing" of the frame from the one computing device to another computing device. Conventionally the devices are considered separate, but computing devices could co-exist. One widely known network layer protocol is the Internet Protocols (IP), which is used by the TCP/IP model.

The transport layer 1508 allows for the transmission and reception of multiple data frames (packets) sent over the network layer 1506. One function of the transport layer to be to reassemble data frames in the transmitted order. Other function of the transport data could be data verification and retransmission of lost data frames. The TCP/IP model generally uses transmission control protocols (TCP) or user datagram protocols (USP). The must significant differences in these protocols is that TCP reassembles out of sequence packets and retransmits lost packages while USP typically only transports the packets.

The session layer 1510 allows applications in the same or different host computing devices to establish a "session." A session is similar in function to a call in PSTN vernacular. The TCP/IP model does not have session layer protocols explicitly defined. Generally, sessions can be classified broadly into simplex, half duplex, and full duplex. Simplex sessions are generally limited to a single host transmitting and one or more hosts receiving. Half duplex includes multiple transmitting hosts; however, only one host transmits data at a time. Full duplex includes hosts transmitting in parallel. As part of establishing the session, the session layer 1510 contains, for example, rules relating to establishing the session (i.e., handshaking procedures), rules relating to identifying the transmission protocols to communicate the data, and rules relating to terminating a session or releasing a call.

The presentation layer 1512 contains rules relating to data transfers between hosts. As part of the transfer, agreement on data formatting must be established between the multiple devices. For example, the data may be formatted to an ASCII representation.

The application layer 1514 generally includes the application or service application. For example, in a text-to-speech system, the service application may be the conversion from the text data representation to the audio data representation.

Figure 16:
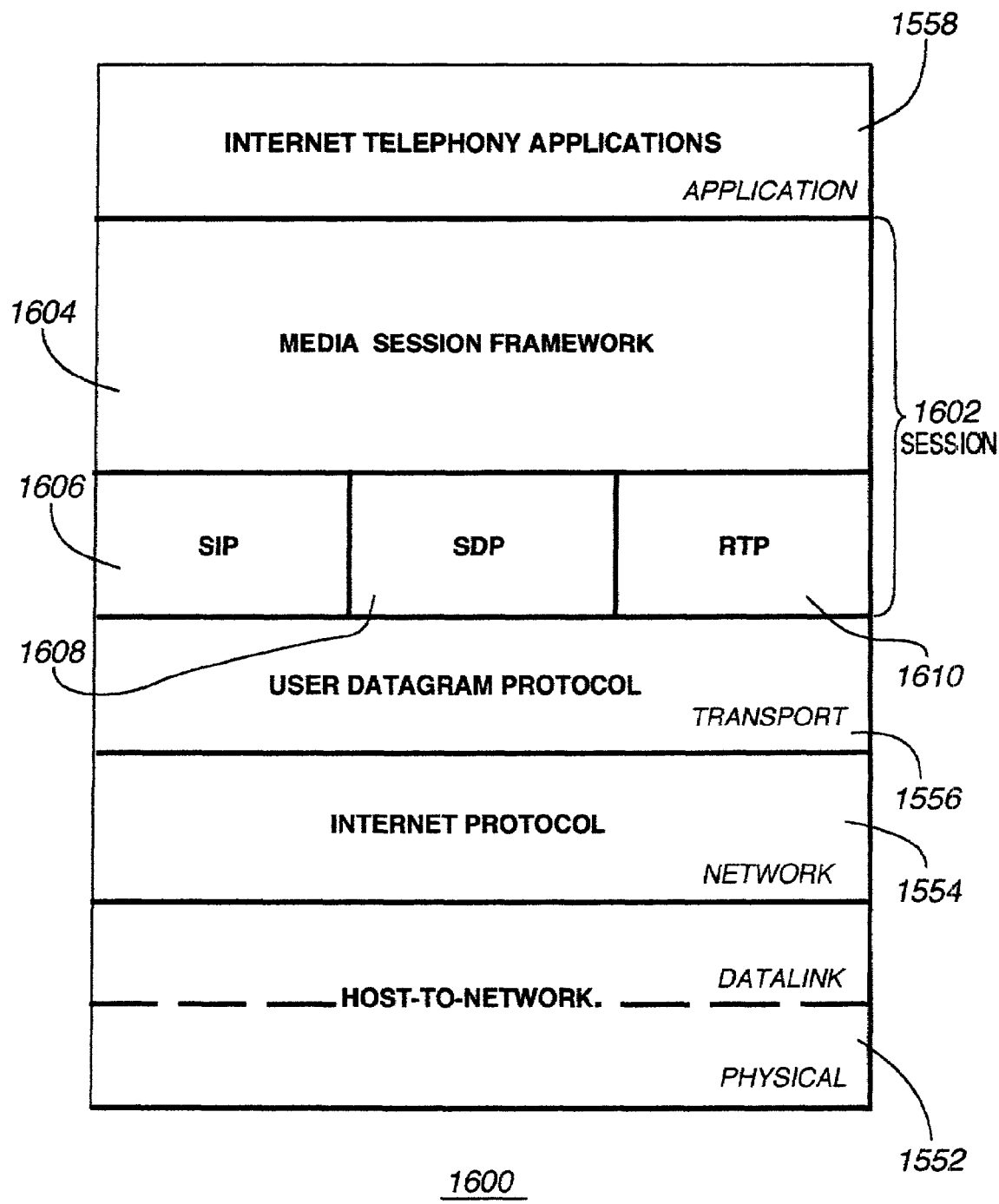
FIG. 16 is a block diagram illustrative of one possible media session framework in accordance with the present invention.

Currently, VoIP uses TCP/IP for media transport; however, as explained above, conventional TCP/IP models do not have adequate methodologies for call control and presentation associated with OSI protocol session layer and presentation layer. One possible way of inserting these layers to the TCP/IP model is to design a Media Session Framework that includes session initiation protocols for call control, session description protocols to identify multimedia physical transport model and data format and media transport protocols. One TCP/IP model 1600 having these layers is shown in FIG. 16. TCP/IP model 1600 includes all the layers shown in TCP/IP model 1550 and includes a session layer 1602. Session layer 1602 includes a media session framework 1604, which includes rules for the interaction of the session initiation protocol section 1606, session description protocols 1608 and real-time transport protocols 1610. While FIG. 16 shows SIP, SDP and RTP, other protocols, as defined above, could be used.

Figure 17:
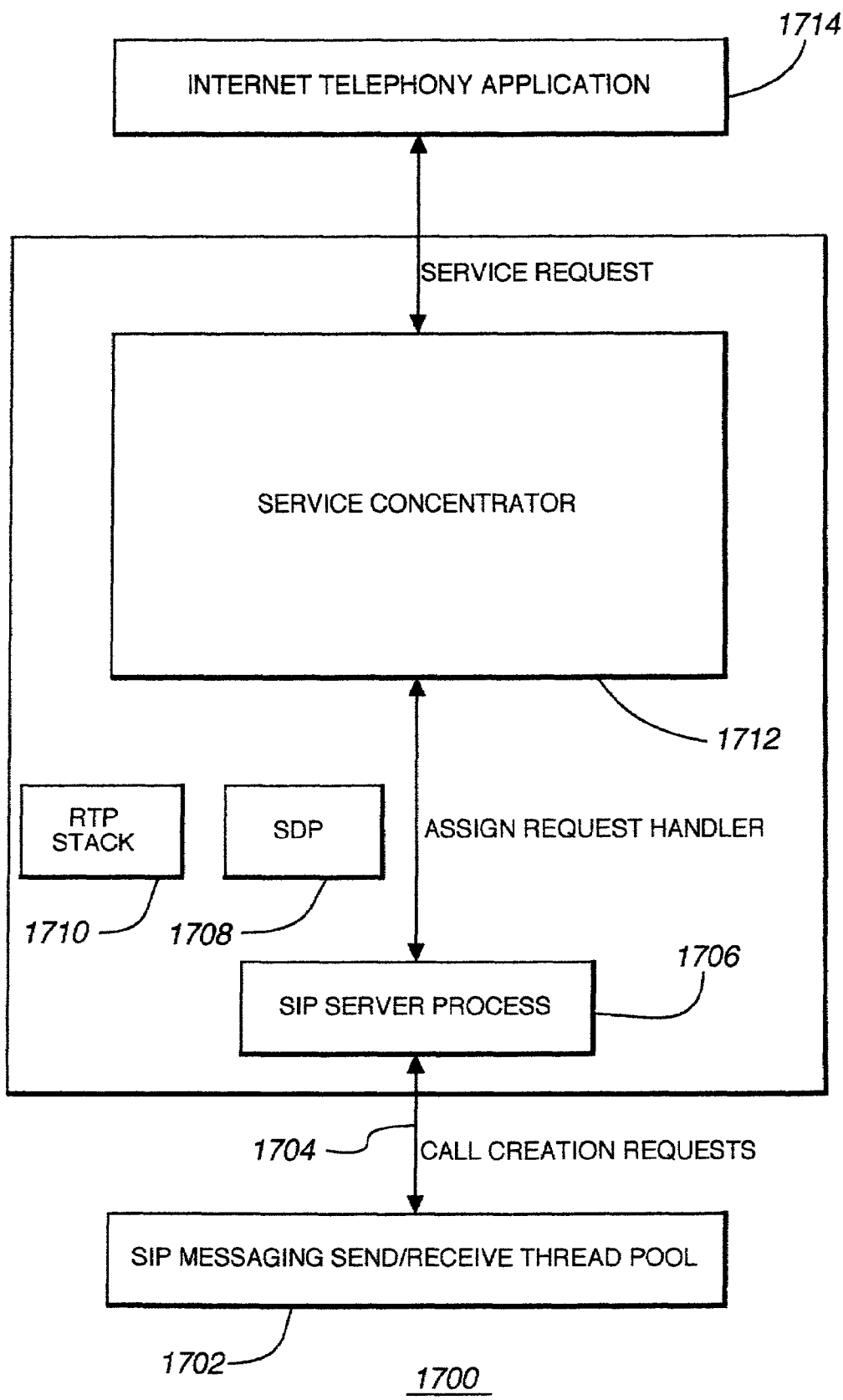
FIG. 17 shows a processor 1700 incorporating a media session framework in accordance with the present invention.

FIG. 17 shows a processor 1700 on which session layer 1600 can be implemented. Processor 1700 includes input 1704 from a client 1702 at a SIP user agent 1706. Client 1702 can be a user calling up an application, can be an application on a separate host processor, or can be an application on an integrated processor. Initially, input 1704 is a call creation request. The call creation request is typically a SIP invitation that includes connection information, as generally described above, as well as other descriptors. SIP user agent 1706 interacts with SDP agent 1708 to identify various protocols, such as the multimedia transport protocols and data format protocols and interacts with media transport protocol agent 1710 to identify whether and which ports support the identified media transport protocols. SIP user agent 1706 then directs the call to service concentrator 1712 that in turn passes the request to a service application 1714, which is further described with respect to FIG. 18.

Figure 18:
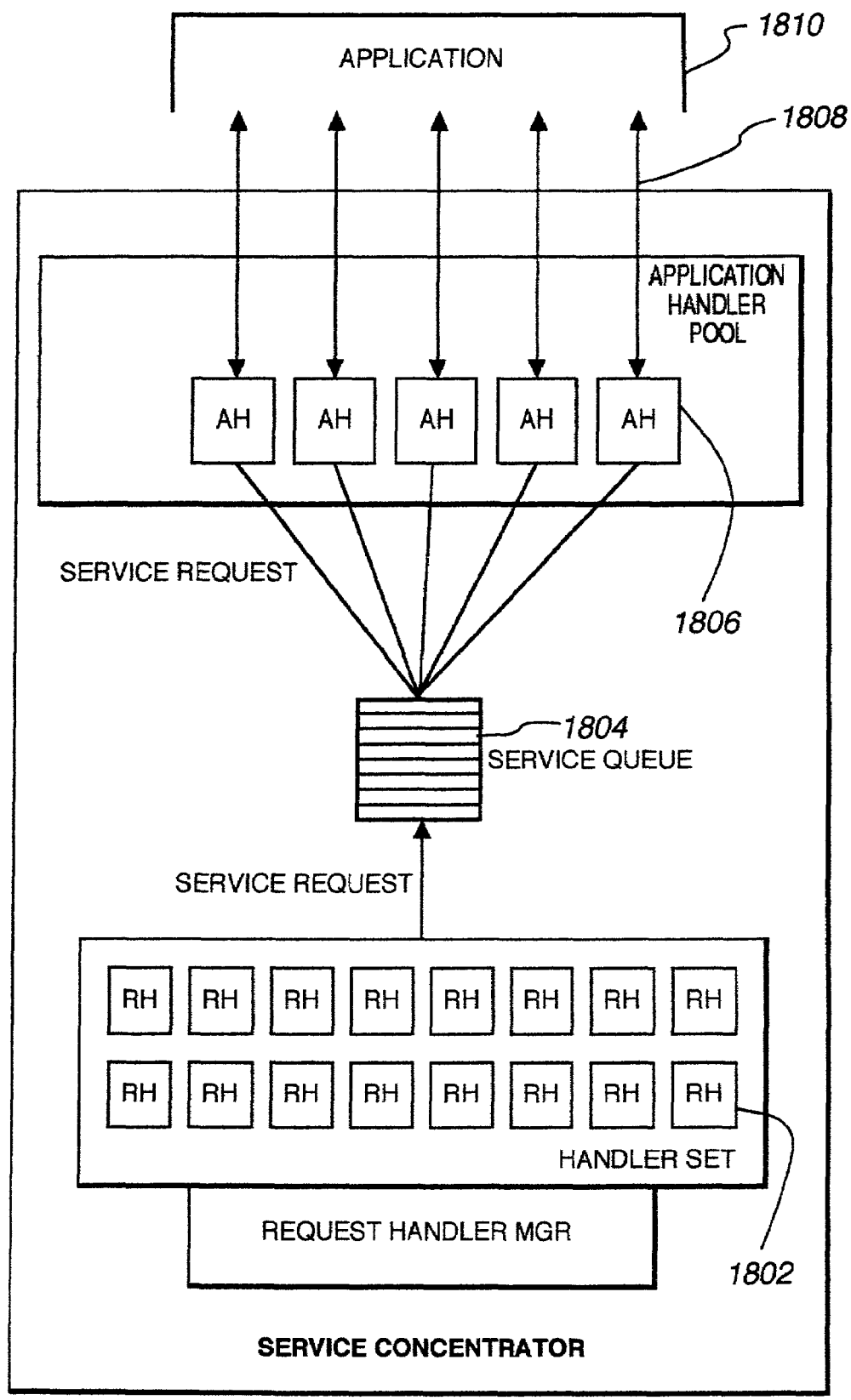
FIG. 18 shows service concentrator 1712 in more detail.

FIG. 18 shows service concentrator 1712 in more detail. Service concentrator 1712 includes request handlers 1802, an input queue 1804 and application handlers 1806, which have worker threads 1808 connected to the service application platform 1810. Worker threads 1808 include communication links, such as, for example, wireless connections, coax cables, fiber optic connections, etc. Service concentrator 1712 can have request handlers 1802 that function under a number of different protocols. Thus, SDP agent 1708 and MTP agent 1710 direct the SIP agent 1706 to direct the call to a particular request handler 1802 capable of supporting the protocols identified. Requests handlers 1802 comply service requests and pass the service request into an input queue 1804. Input queue 1804 holds the service request until an application handler 1806 indicates that a worker thread 1808 has become available to process the service request. Because a large number of requests can be stored in the queue, it is possible to support a greater number of request handlers 1802 than application handlers 1806. When the application handler 1806 indicates a free worker thread 1808, the service request stored in the queue is removed and forwarded to the service application platform 1810 for processing. Once the requested service is preformed, the application handler 1806 passes the result back to the address indicated by the service request (which could be the requesting application or user as is generally described above). Notice, application handler 1806 could pass the result back to an output queue that could then pass the request back up to the requesting address.

Once the request is process and the application handler 1806 has passed the completed service request back to the proper address, agent 1706 terminates the call connection freeing up the request handler to generate the next service request. Notice, one of skill in the art would, on reading this disclosure, understand that the request handler could be released prior to complete the request.

While the invention has been particularly shown and described with reference to presently preferred embodiments thereof, it will be understood by those skilled in the art that various other changes in the form and details may be made without departing from the spirit and scope of the invention.

We claim:

1. A method performed on at least one processor for multiplexing applications, the method comprising the steps of:

providing at least one access server that has access to at least one application, the at least one application capable of having a plurality of running instances, each of the instances capable of receiving and processing requests for a first service provided by the application during a session with a client;

receiving a request from at least one client at the access server to access the first service provided by the at least one application;

based on the received request, establishing a communication link between the at least one access server and the at least one client;

storing the received request in an input request queue with other received requests, wherein the number of received requests may be greater than the number of running instances;

checking for an available communication path to the requested application, an available communication path being present when an instance of the requested application is available and ready to accept a new request;

when an available communication path is available, establishing the communication path between the input request queue and the at least one application;

removing the stored request;

sending the stored request to the requested application; and establishing a communication path between the client and the requested application, thereby establishing a session with the client and the requested application and providing the first service to the client.

2. The method according to claim 1, further comprising the step of:

identifying a media transmission protocol based on the received request, wherein the established communication link is capable of transmitting the identified media transmission protocol.

3. The method according to claim 2, further comprises the steps of:

verifying an accuracy of transmitted data; and
re-transmitting inaccurate data.

4. The method according to claim 1, wherein the establishing the communication link step uses, at least one of session initiation protocols, (SIP) H.323 protocols, MGCP protocols, MEGACO protocols, and H.248 protocols.

5. The method according to claim 2, wherein the identifying the media transmission protocol uses, session description protocols.

6. The method according to claim 2, wherein the identified media is a real-time transport protocol.

7. The method according to claim 1, wherein the receiving the request step further comprises:

accepting a request at a request handler;
generating a service request; and
transmitting the generated service request to the input request queue for storage.

8. A computer program product comprising:

a computer usable medium including computer readable code embodied therein for processing data to control at least one requests for access to at least one application, the computer usable medium comprising:

a request receiving module configured to receive at least one request for access to at least a first service provided by a first application;

a communication establishing module configured to establish a communication link with at least one client requesting access to the first application;

a storing module configured to store the at least one received request;

a checking module configured to check whether a communication path that is capable of allowing access to the first application is available; and the communication establishing module further configured to establish a communication link with the first application, wherein the number of requests for access to the first application are capable of being greater than the number of requests capable of being processed by the first application.

9. The computer program product according to claim 8, further comprising:

a service concentration module configured comprise:
at least one request handler;
the at least one request handler generating at least one service request to be stored in the storing module; and
at least one application handler, such that the at least one application handler removes the stored request and transmits the stored request to the at least one application for processing.

10. The computer program product according to claim 8, wherein the communication module is further configured to output at least one processed request to at least one address indicated by the at least one client.

11. The computer program product according to claim 8, wherein the storing module is further configured to store at least one processed request prior to delivery.

12. The computer program product according to claim 9, further comprising:

a sip agent module configured to provide call control.

13. The computer program product according to claim 12, further comprising:

a sdp agent module configured to provide session descriptions, such that the sip agent module directs the at least one request to a compatible request handler module.

14. The computer program product according to claim 13, further comprising:

a media transport protocol agent configured to provide transport protocols.

15. A computer program product comprising:

a computer usable medium including computer readable code embodied therein for processing data to control at least one requests for access to at least one application, the computer usable medium comprising:

a request receiving module configured to receive at least one request for access to a first service provided by the at least one application;

a first communication establishing module configured to establish a communication link with at least one client requesting access to the first service provided by the at least one application;

a storing module configured to store the at least one received request;

a checking module configured to check whether a communication path that is capable of allowing access to the at least one application; and a second communication establishing module configured to establish a communication link with the at least one application and thereby establish a communication link between the client and the application, wherein the first communication establishing module is configured to establish more communication links than the second communication establishing module.

16. The computer program product according to claim 15 further comprising:

a third communication establishing module configured to establish a communication link with at least one address to receive at least one processed request.

* * * * *